US008610796B2

United States Patent
Kindaichi

(10) Patent No.: US 8,610,796 B2
(45) Date of Patent: Dec. 17, 2013

(54) DIGITAL CAMERA CAPABLE OF CONTINUOUS SHOOTING

(75) Inventor: Takeshi Kindaichi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 34 days.

(21) Appl. No.: 13/227,010

(22) Filed: Sep. 7, 2011

(65) Prior Publication Data

US 2012/0057048 A1 Mar. 8, 2012

(30) Foreign Application Priority Data

Sep. 8, 2010 (JP) ................. P2010-200693

(51) Int. Cl.
  *H04N 5/76* (2006.01)
  *H04N 13/00* (2006.01)
  *H04N 5/225* (2006.01)
  *H04N 5/228* (2006.01)
  *G03B 3/00* (2006.01)
  *G03B 13/18* (2006.01)

(52) U.S. Cl.
  USPC .............. 348/231.99; 348/345; 348/220.1; 348/222.1; 348/221.1; 396/102; 396/89; 396/79

(58) Field of Classification Search
  USPC ............ 348/326, 345–356, 362–366, 220.1, 348/221.1, 222.1, 231.99, 333.01; 396/79, 396/89, 102
  See application file for complete search history.

(56) References Cited

U.S. PATENT DOCUMENTS

| | | | | |
|---|---|---|---|---|
| 6,906,751 | B1 * | 6/2005 | Norita et al. | 348/349 |
| 7,787,019 | B2 * | 8/2010 | Nonaka | 348/221.1 |
| 7,787,020 | B2 * | 8/2010 | Watanabe | 348/221.1 |
| 2007/0070238 | A1 * | 3/2007 | Sugimoto et al. | 348/345 |
| 2008/0074534 | A1 * | 3/2008 | Kusaka | 348/364 |
| 2012/0057048 | A1 * | 3/2012 | Kindaichi | 348/231.99 |

FOREIGN PATENT DOCUMENTS

JP 2005-024858 1/2005

* cited by examiner

*Primary Examiner* — Nhan T Tran
*Assistant Examiner* — Marly Camargo
(74) *Attorney, Agent, or Firm* — John C. Pokotylo; Straub & Pokotylo

(57) ABSTRACT

A digital camera of the present invention comprises: an imaging section, a read out section for reading out first image data for still picture storage from the imaging section, a storage section subjecting the first image data to image processing and storing the resultant data, an image data generating section for generating second image data that has fewer pixel data than the first image data, from the first image data, and a detection section for detecting at least one evaluation value based on the second image data, wherein a detection operation of the evaluation value by the detection section is executed in parallel to a still picture storage operation by the storage section.

19 Claims, 15 Drawing Sheets

AF EVALUATION VALUE

FIG. 13

| SUBJECT MOVEMENT DIRECTION AT THE TIME OF CONTINUOUS SHOOTING | LENS DRIVE DIRECTION AT THE TIME OF LIVE VIEW DISPLAY | FOCUS POSITION PREDICTION | PREDICTED FOCUS POSITION |
|---|---|---|---|
| FAR → CLOSE | CLOSE → FAR | POSSIBLE | x [pls] TOWARDS CLOSE UP END |
| | FAR → CLOSE | NOT POSSIBLE | TOWARDS CLOSE-UP END |
| CLOSE → FAR | CLOSE → FAR | | TOWARD LONG DISTANCE END |
| | FAR → CLOSE | POSSIBLE | x [pls] TOWARDS LONG DISTANCE END |

DIGITAL CAMERA CAPABLE OF CONTINUOUS SHOOTING

Benefit is claimed, under 35 U.S.C. §119, to the filing date of prior Japanese Patent Application No. 2010-200693 filed on Sep. 8, 2010. This application is expressly incorporated herein by reference. The scope of the present invention is not limited to any requirements of the specific embodiments described in the application.

BACKGROUND OF THE INVENTION

1. Field of the Invention

The present invention relates to a digital camera that is capable of continuously shooting still images.

2. Description of the Related Art

A digital camera capable of continuously shooting still images at a frame rate of 10 per second is known. With this type of digital camera, an AF (auto focus) operation for a photographing lens is carried out before commencing continuous shooting, and continuous shooting is started after achieving focus of the photographing lens. However, there are cases where the photographing lens goes out of focus during the continuous shooting. A digital single lens reflex camera that carries out an alarm display on display means in the event that it has been determined that a contrast value during a continuous shooting operation is lower than a contrast value immediately after shooting is disclosed in Japanese patent laid-open No. 2005-24858 (laid open Jan. 27, 2005) (hereafter referred to as patent document 1).

With the digital single lens reflex camera disclosed in patent document 1, taken images are stored during continuous shooting, stored images equivalent to an AF target are read out after the storing of the taken images to calculate contrast, and a focused state is determined based on this contrast. It is therefore possible to use in determination of lowered contrast, but it is not possible to use as information for focusing.

The reason why image data during continuous shooting can not be used as information for focusing with this related art digital camera will be described using FIG. 15. An image sensor 1 converts a subject image to image data under control of a TG (Timing Generator) 3, and outputs the image data. At the time of live view display the TG 3 outputs image data to the extent of the VGA standard (640×480 pixels) for live view display to a DRAM 5. Image data temporarily stored in the DRAM 5 is subjected to image processing for live view display by an image processing section 17, and then output to a TFT (TFT liquid crystal display) that acts as a display, and live view display is carried out. Also, image data that has been output from the image sensor 1 has a contrast value calculated as an AF evaluation value by an AF evaluation value calculating section 15, and automatic focusing of the photographing lens is carried out based on this contrast value.

On the other hand, the TG 3 outputs image data for all pixels to the DRAM 5 as taken image data for storage. Image data that has been temporarily stored in the DRAM 5 is image processed for storage by the image processing section 17, and subjected to image compression by a compression processing and image file making section 19, followed by being output to storage media 9 and image data storage being carried out. Recent digital cameras and the like demand high resolution, with the number of pixels of images sensors increasing, and image data output from an image sensor 1 at the time of still image shooting corresponds to all pixels, which means that the data amount becomes extremely large.

In a case where an AF evaluation calculation section 15 for processing image data corresponding to all pixels output from the image sensor 1 at the time of this type of still picture shooting is constructed in hardware, from a viewpoint of high speed processing the technological hurdles are high, which leads to a cost increase. On the other hand, in the case where an AF evaluation value is calculated using firmware processing, processing time becomes long, which is impractical from the viewpoint of high speed continuous shooting. At the time of continuous shooting etc. therefore, as described previously, it is possible to determine whether or not contrast has lowered, but it is not possible to use as information for focusing. It has not been possible to improve following capability of the focusing operation during a continuous shooting operation.

SUMMARY OF THE INVENTION

The present invention has as its object to provide a digital camera capable of improving following capability of a focusing operation during a continuous shooting operation.

A digital camera of the present invention comprises: an imaging section, a read out section for reading out first image data for still image storage from the imaging section, a storage section subjecting the first image data to image processing and storing the resultant data, an image data generating section for generating second image data that has fewer pixel data than the first image data, from the first image data, and a detection section for detecting at least one evaluation value based on the second image data, wherein a detection operation of the evaluation value by the detection section is executed in parallel with a still picture storage operation by the storage section.

Also, a digital camera of the present invention comprises: an imaging section, a read out section for reading out first image data for still image storage from the imaging section, a storage section subjecting the first image data to image processing and storing the resultant data, an image data generating section for generating second image data that has fewer pixel data than the first image data, from the first image data, a first detection section for detecting an AF evaluation value based on the second image data, and a determination section for determining a specified amount of variation in degree of focus based on AF evaluation value output of the first detection section, wherein determination of degree of focus by the determination section is executed in parallel with a still image storage operation by the storage section.

Also, an evaluation value detection method of the present invention detects evaluation value based on image data for still image storage output from an imaging section, and comprises reading out first image data for still image storage from the imaging section, subjecting the first image data to image processing and storing resultant data, and in parallel, generating second image data having fewer pixel data than the first image data from the first image data, and detecting at least one evaluation value based on the second image data.

BRIEF DESCRIPTION OF THE DRAWINGS

FIG. 13 is a drawing showing a relationship between subject movement and processing content in accordance with lens drive direction, for the digital camera of one embodiment of the present invention.

DETAILED DESCRIPTION OF THE PREFERRED EMBODIMENT

Figure 1:
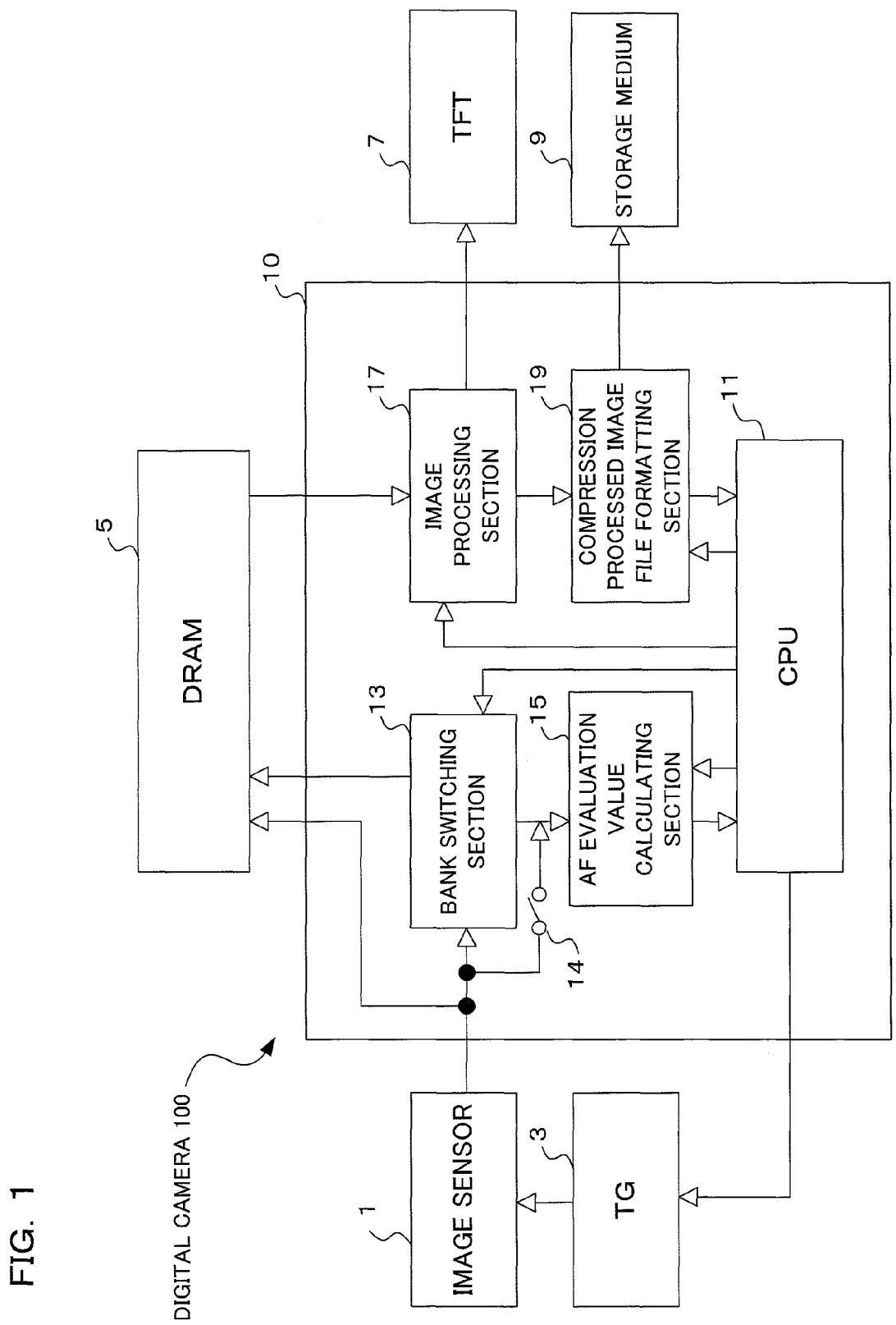
FIG. 1 is a block diagram showing overall structure of a digital camera of one embodiment of the present invention, mainly concentrating on the electrical systems.

FIG. 1 is a block diagram showing overall structure of a digital camera 100 of one embodiment of the present invention, mainly concentrating on the electrical systems. An image sensor 1 photoelectrically converts a subject image formed by a photographing lens, not shown, into image signals, and outputs as image data after AD conversion of the image signals. A two-dimensional solid image sensor such as CCD (Charge coupled device) or CMOS (Complementary Metal Oxide Semiconductor) etc. is used as the image sensor 1.

A TG (Timing Generator) 3 receives a control signal from a CPU 11, which will be described later, and performs read out of image signals from the image sensor 1. With control of readout by the TG 3, during live view display, image signals based on a number of pixels of a VGA standard amount are output, and at the time of still image shooting and continuous shooting image signals based on the total pixel number are output.

A CPU (Central Processing Unit) 11, bank switching section 13, switch 14, AF evaluation value calculating section 15, image processing section 17, and compression processed image file formatting section 19 are provided within an ASIC (Application Specific Integrated Circuit) 10. The CPU 11, is connected to the TG 3, bank switching section 13, AF evaluation value calculating section 15, image processing section 17 and compression processed image file formatting section 19 and carries out overall control of the digital camera 100 in accordance with programs stored in a non-volatile memory (not illustrated).

The bank switching section 13 is input with full pixel image data that has been output from the image sensor 1, resizes to VGA standard image data by thinning processing or the like, and outputs this image data to a DRAM 5 and the AF evaluation value calculating section 15. As one example of operation of the bank switching section 13, if a full pixel number of the image sensor 1 is 12,000,000 pixels (image size is made 4,000×3,000), bank switching processing is carried out by respectively thinning to ⅙ of the number of pixels in the horizontal and vertical directions, in order to resize to an image size equivalent to the VGA standard.

It is also possible for the bank switching section 13 to be input with full pixel image data output from the image sensor 1 and to resize using pixel addition (pixel mixing) processing. It is also possible for the image size resized by the bank switching section 13 to be an image size that matches a display element for live view display or specifications of an EVF (electronic viewfinder), as well as the VGA standard. In this case, the image size at the time of input to the AF evaluation value calculating section 15 (the same also applies to subject tracking and face detection of the image processing section 17, which will be described later) can obviously also match an image size that has been resized by the bank switching section 13.

It is also possible, in the case where the image sensor 1 has a mode for performing thinning readout and additive readout, for the image data that has been output from the image sensor 1 and input to the bank switching section 13 to not only be full pixel data, but also image data that has been subjected to thinning read out or additive readout. In the case where the number of pixels of the image sensor 1 becomes an enormous numerical value also, it can be handled using the above-described method.

The switch 14 is connected between the image sensor 1 and the AF evaluation value calculating section 15, and is turned on and off based on a control signal from the CPU 11. At the time of live view display, the CPU 11 turns the switch 14 on, and image data from the image sensor 1 is output to the AF evaluation value calculating section 15 without passing through the bank switching section 13. On the other hand, at the time of continuous shooting, the CPU 11 turns the switch 14 off, and after image data from the image sensor 1 has been converted to VGA standard image data by the bank switching section 13 it is output to the AF evaluation value calculating section 15.

The AF evaluation value calculating section 15 is input with image data from the bank switching section 13 or the switch 14, and calculates an AF evaluation value. The AF evaluation value calculating section 15 extracts a high-frequency component from within the input image data, and outputs the high-frequency component to the CPU 11 as an AF evaluation value (contrast value). As described previously, a photographing lens for forming a subject image is arranged in front of the image sensor 1. The CPU 11 adjusts a focus position of the photographing lens and carries out automatic focus adjustment so that the AF evaluation value (contrast value) calculated by the AF evaluation value calculating section 15 becomes a peak.

The DRAM (Dynamic Random Access Memory) 5 is a volatile memory, connected to the image sensor 1 and the bank switching section 13, and temporarily stores image data. A first region and a second region are provided as regions for temporary storage. As will be described later (refer to S185 and S189 of FIG. 9), the first region is a region for temporarily storing image data that has been read out for all pixels at the time of a shooting operation, and the second region is a region for temporarily storing image data that has been resized by the bank switching section 13. The DRAM 5 outputs temporarily stored image data to the image processing section 17.

The image processing section 17 is input with image data that has been temporarily stored in the DRAM 5, and carries out image processing. The image processing section 17 performs various image processing such as digital amplification (digital gain adjustment processing), color correction, gamma (γ) correction, contrast correction, monochrome or color mode processing, and processing for live view display for image data that has been input. The image processing section 17 also generates display image signals with respect to image data for live view display temporarily stored in the DRAM 5, or image data that has been read out from the storage media 9.

The image processing section 17 also carries out subject tracking using low volume image data as the same level as for live view display. Subject tracking involves comparing current and previous image data, detecting whether or not there are portions that do not coincide, namely whether or not the subject has moved, and, in the event that there is a moving subject, detecting the position of the subject. Further, the image processing section 17 carries out face detection using low-volume image data that is of the same level as for live view display. Face detection involves prior storage of various parts such as the eyes, nose and mouth of a person or the like, and detecting whether or not the face of a person exists by determining whether or not there is a match with these stored parts. In the event that a face exists, the position of this face is also detected.

A TFT (TFT Liquid Crystal Display) 7 is a large screen liquid crystal panel connected to the image processing section 17, and arranged on a rear surface etc. of the camera. The user can observe a live view image or playback image etc. displayed on the screen of the TFT 7. The TFT 7 is not limited to a liquid crystal panel, and can also be, for example, a display panel for image display such as an organic EL.

The compression processed image file formatting section 19 is input with image data from the image processing section 17, and performs compression using the JPEG system or TIFF system etc. to create an image file. Image data that has been read out from the storage medium 9 is also expanded. Image compression is not limited to the JPEG system or TIFF system, and other compression methods can also be adopted. The storage medium 9 is a storage medium for storing image data of still images that have been compressed by the compression processed image file formatting section 19, or continuously shot images.

Figure 2:
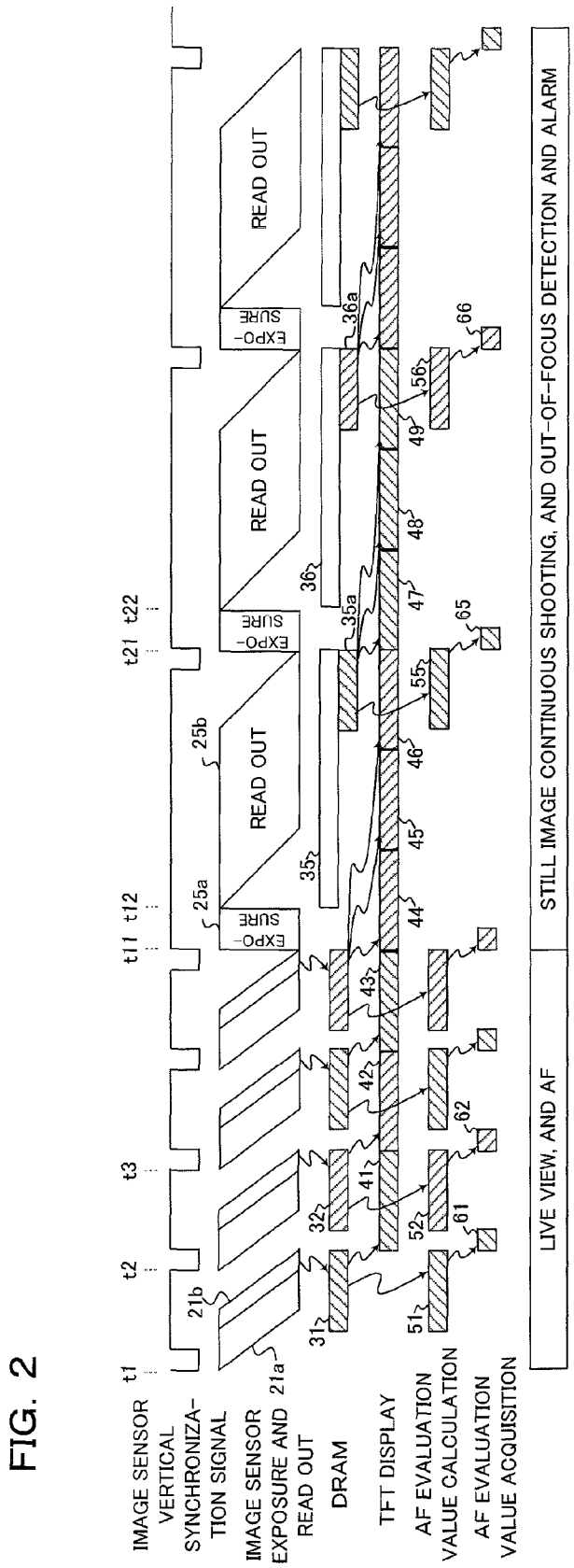
FIG. 2 is a timing chart showing operation at the time of live view display and at the time of continuous shooting in the digital camera of one embodiment of the present invention.

Next, live view display and an automatic focus adjustment operation at the time of continuous shooting in this embodiment will be described using FIG. 2. In the timing chart shown in FIG. 2, the upper trace shows a vertical synchronization signal for the image sensor 1, and the trace below that shows exposure timing and readout timing for the image sensor 1. The trace below that shows temporarily stored data of the DRAM 5, the trace below that shows display content for the TFT 7, the trace below that shows AF evaluation value calculation, and the lower trace shows acquisition of AF evaluation value.

From time t1-t11 shows live view display in progress, on the right side from time t11 shows continuous shooting in progress. If a release button, not shown, is pressed down half way, the digital camera 100 enters a shooting preparation state, and live view display and an AF operation are executed. In a state where continuous shooting mode has been set, if the photographer presses the release button down further to go from a half-pressed state to a fully pressed state (time t11), the digital camera 100 commences continuous shooting.

If the vertical synchronization signal for the image sensor 1 becomes L level at time t1, the image sensor 1 commences an exposure operation. An electronic shutter of the image sensor 1 is a rolling shutter, with exposure start and exposure finish being offset for each row of pixels, and once the exposure operation has been completed for each row of pixels, a continuous read-out operation is carried out. An exposure operation region (refer to reference numeral 21*a*) and the readout region (refer to reference numeral 21*b*) are the rolling shutter, and therefore take a rhombus shape on the timing chart.

Reference numeral 21*b* represents image data read out, and image data that has been read out from the image sensor 1 is temporarily stored in the DRAM 5 (refer to reference numeral 31). Image data that is the same as image data temporarily stored in the DRAM 5 is also output to the AF evaluation value calculating section 15 by way of the switch 14, and the AF evaluation value (contrast value) is calculated (refer to reference numeral 51). This calculated AF evaluation value is acquired by the CPU 11 (refer to reference numeral 61), and the CPU 11 executes an automatic focus adjustment operation for the photographic lens based on the acquired AF evaluation value.

Also, once a read-out operation for the previous exposure operation (refer to reference numeral 21*b*) is completed, this image data that has been temporarily stored in the DRAM (refer to reference numeral 31) is subjected to image processing by the image processing section 17, and live view display is performed on the TFT 7 based on the image processed image data (refer to reference numeral 41).

In this way, the digital camera 100 carries out automatic focus adjustment together with calculation of AF evaluation value using the image data that has been read out from the image sensor 1 between t1-t2 (refer to reference numerals 51, 61), and performs live view display on the TFT 7 (refer to reference 41). Similarly, AF evaluation value is calculated and automatic focus adjustment carried out using image data that has been read out during time t2-t3 (refer to reference numerals 52, 62), and live view display is carried out on the TFT 7 (refer to reference numeral 42). This operation is subsequently repeated until time t11.

Next, if the release button is pressed down fully (at time t11) there is a transition to a shooting operation. First, a reset operation is carried out for all pixels of the image sensor 1, and exposure is commenced simultaneously for all pixels (refer to reference numeral 25*a*). After commencement of exposure, once a manually or automatically set shutter speed has elapsed (at time t12), exposure is simultaneously stopped for all pixels by a mechanical shutter. Once the exposure operation has stopped, readout of image signals from each pixel is next started (refer to reference numeral 25*b*). At the time of image signal read out, more time is taken compared to at the time of live view display because image signals are read out for all pixels.

Image data read out in the period of reference numeral 25*b* is temporarily stored in the DRAM 5 (refer to reference numeral 35), while on the other hand image data that is equivalent to this is also output to the bank switching section 13. The bank switching section 13, as has been described above, converts to image data (for example data of the VGA standard) that is equivalent to image data used in live view display (refer to reference numeral 35*a*). Image data that has been converted by the bank switching section 13 is used to calculate an AF evaluation value by the AF evaluation value calculating section (refer to reference numeral 55). The CPU 11 carries out processing in accordance with this AF evaluation value once the AF evaluation value has been acquired (refer to reference numeral 65). This processing will be described later using FIG. 3.

If continuous shooting of a first frame is carried out during time t11-t21, continuous shooting for a second frame is carried out from time t21. At this time, images at the time of continuous shooting are displayed on the TFT 7 (refer to reference numerals 47, 48, 49) using image data that has been temporarily stored in the DRAM 5 at the time of continuous shooting of the first frame (refer to reference numeral 35*a*). Also, the bank switching section 13 generates image data that is equivalent to image data for live view display (refer to reference numeral 36*a*) based on image data that has been read out at the time of continuous shooting for the second frame. The AF evaluation value calculating section 15 calculates an AF evaluation value using this image data (refer to reference numeral 56), and the CPU 11 acquires the AF evaluation value (refer to reference numeral 66), and carries out processing in accordance with the AF evaluation value.

Figure 3:
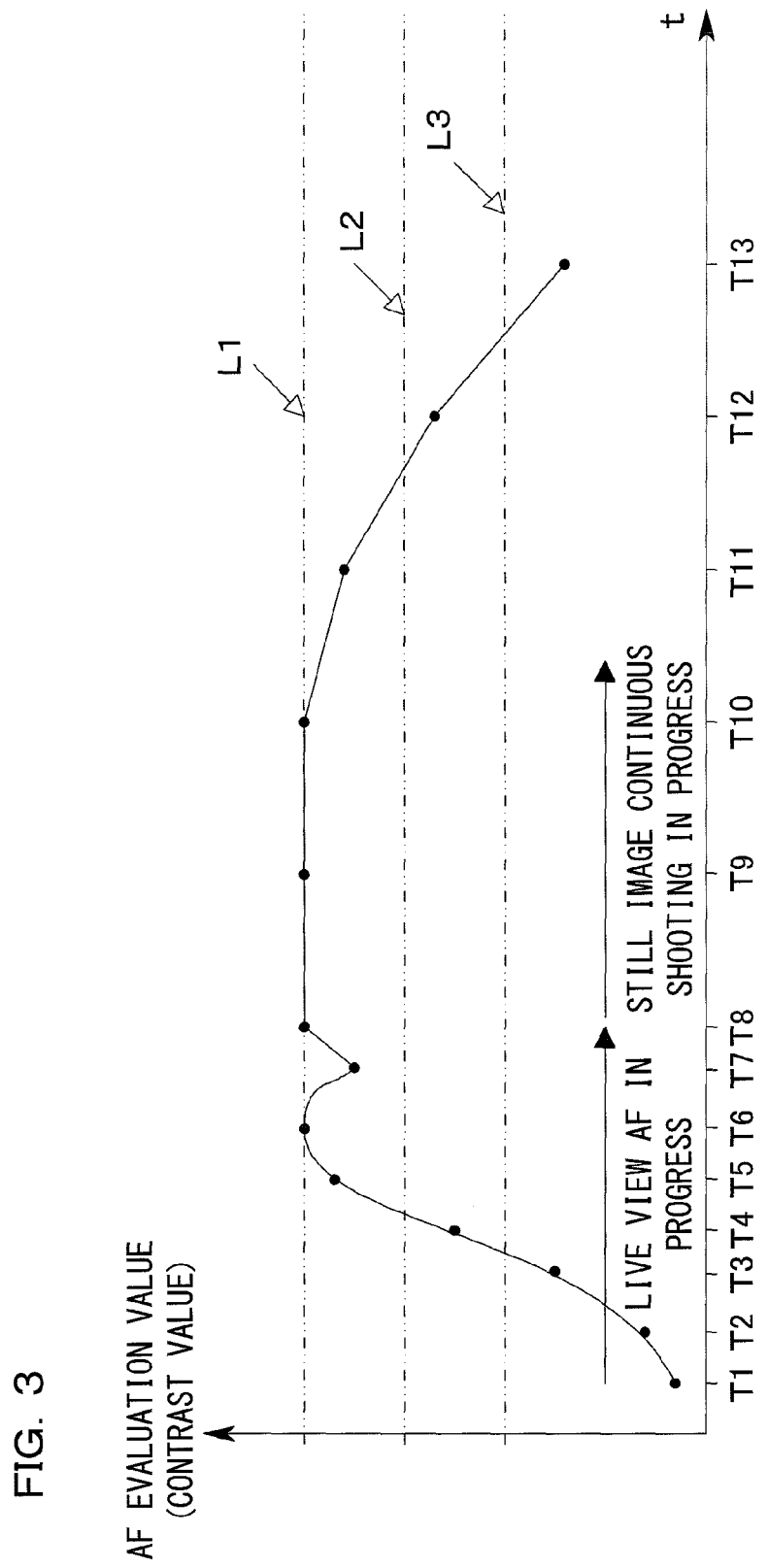
FIG. 3 is a graph showing AF evaluation value transition for the digital camera of one embodiment of the present invention.

Next, processing in accordance with an AF evaluation value that is carried out in reference numeral 65 and 66 will be described using FIG. 3. FIG. 3 has time on the horizontal axis, and evaluation value (contrast value) on the vertical axis, and shows transition states of AF evaluation value. Also, an evaluation value L1 is an evaluation value when AF evaluation value has reached a peak, and is an AF evaluation value when the photographing lens has reached a focus position. L2 is threshold value 1, and L3 is threshold value 2. Threshold level 1 and threshold level 2 are set so as to give a specified ratio with respect to a reference AF evaluation value. In FIG. 3, live view display is in progress from time T1 to time T8, and during this time if the CPU 11 acquires an AF evaluation value automatic focus adjustment for the photographic lens is carried out based on this AF evaluation value, and so focus is gradually achieved. With the example shown in FIG. 3, a focused state is reached at the time T8.

Also, continuous shooting commences from time T8, and at times T9, T10, . . . T13 respective still images are acquired and AF evaluation values are calculated by the AF evaluation value calculating section 15. At times T8, T9, T10, the AF evaluation value is a reference AF value L1, but after that the AF evaluation value gradually lowers, until at time T12 it becomes lower than the first threshold value L2, and at time T13 it becomes lower than the second threshold value L3. With this embodiment, if the AF evaluation value drops below the first threshold value L2 alarm display is carried out, and if the AF evaluation value drops below the second threshold value L3 continuous shooting is interrupted and automatic focus adjustment operation is executed.

The first threshold value L2 is made, for example, a determination value for issuing an alarm by setting to a focus slip amount equivalent to half the extent of permissible focus range from when in focus L1. Also, the second threshold value L3 is made, for example, a determination value for prohibiting shooting by setting to a focus slip amount equivalent to a permissible focus range from in focus L1.

In this way, at the time of continuous shooting image data of all pixels read out from the image sensor 1 is converted to image data equivalent to image data for live view display by the bank switching section 13. Then, an AF evaluation value is calculated using the converted image data, and processing appropriate to this AF evaluation value is carried out.

Next, operation of this embodiment will be described using the flowcharts shown in FIG. 4 to FIG. 11. These flowcharts (also including the flowchart shown in FIG. 14 of a modified example of the present invention, which will be described later) are executed by the CPU 11 in accordance with programs stored in memory, not shown.

Figure 4:
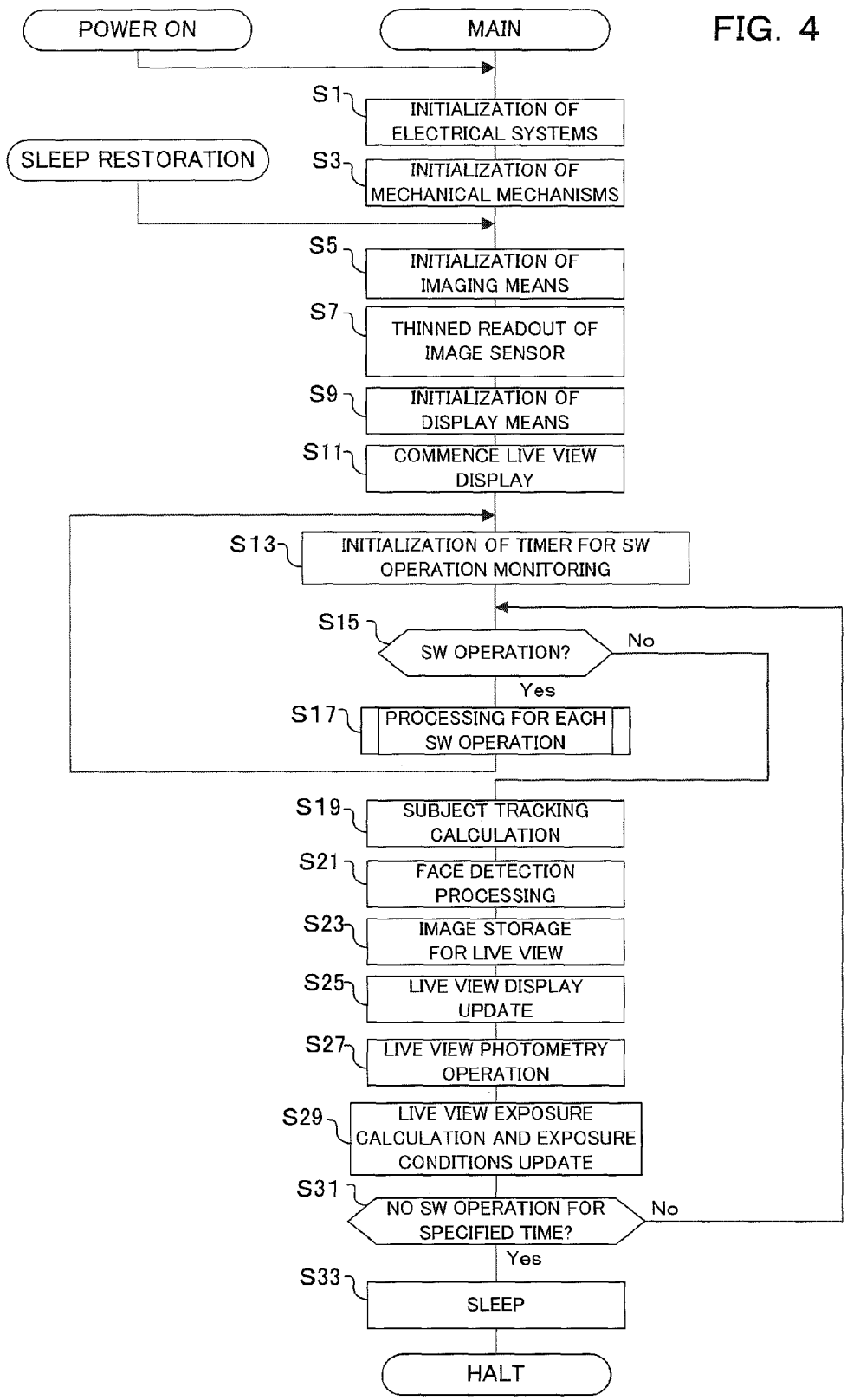
FIG. 4 is a flowchart showing main flow of the digital camera of one embodiment of the present invention.

FIG. 4 shows the main flow. This main flow is executed in the event that a power supply battery is loaded into the digital camera 100, or when a power supply switch is turned on. If the main flow is entered, first initialization of the electrical systems is carried out (S1), and initialization of mechanical mechanisms is carried out (S3).

If initialization of mechanical mechanisms has been carried out, or if the camera is restored from a sleep state, initialization of imaging means is carried out (S5). The image sensor 1, TG 3 and their peripheral circuits are denoted as imaging means, and in this step these circuits are initialized. A sleep state is a state where, when the user has not operated any switches of the digital camera for a specified time, the clock speed of the CPU 11 is lowered, it is made possible to interrupt only specified operation members, and power consumption is reduced.

If the initialization of the imaging means has been carried out, thinning readout of the image sensor 1 is commenced (S7). Here, image signals are read out from the image sensor 1 by the TG 3 skipping some pixels. Next, initialization of display means is carried out (S9), and live view display is commenced (S11). Here, image data that has been read out from the image sensor 1 is temporarily stored once in the DRAM 5, and after being subjected to image processing by the image processing section 17 it is subjected to live view display on the TFT 7.

If live view display has commenced, a timer for switch operation monitoring is next initialized (S13). As was described previously, if there is no switch operation for a specified period a sleep state is entered, and in this step a timer for timing the specified period is initialized.

Once the timer is initialized, is next determined whether or not there is a switch operation (S15), and if the result of this determination is that there is a switch operation processing according to the operated switch is executed (S17). Detailed operation of this processing for each switch operation will be described later using FIG. 5. Once processing for each operated switch has been carried out, processing returns to step S13.

On the other hand, if the result of determination in step S15 is that there has not been a switch operation, subject tracking calculation is next carried out next (S19). Here, the image processing section 17 detects movement of the subject such as a person using image data that has been read out for live view display and stored in the DRAM 5. By carrying out this subject tracking calculation, automatic focus adjustment and automatic exposure control are made possible for the subject.

Once subject tracking calculation has been carried out, face detection calculation is next carried out (S21). Here, the image processing section 17 detects whether a face of a person is contained in the image, and if so, the position etc. of the face, using image data that has been read out for live view display and stored in the DRAM 5.

Once face detection calculation has been carried out, image processing for live view display is carried out (S23), and live view display is updated (S25). Next, using an image for live view, live view photometry is carried out (S27), and live view exposure calculation and updating of exposure conditions is carried out (S29). Here, shutter speed of the rolling shutter and ISO speed of the image sensor 1 are controlled in response to the subject brightness so that live view display to be displayed on the TFT 7 has the appropriate exposure.

Next it is determined whether or not there has been no switch operation for specified time (S31). Here, it is determined whether or not the timer that was initialized in step S13 has reached the specified time. If there has been a switch operation, then after carrying out processing according to the switch operation in step S17, the timer is initialized in step S13. However, if there has been no switch operation within the specified time, the timer time elapses and in step S31 it is determined that there has been no switch operation in the specified time.

If the result of determination in step S31 is that there has been a switch operation in the specified time, processing returns to step S15. On the other hand, if the result of determination is that there has been no switch operation in the specified time, a sleep state is entered (S33). If the sleep state is entered, then as was described previously the camera is put into a low-power consumption mode, and if a specified operation member is operated the camera restores from the sleep state and restarts operations from step S5.

Figure 5:
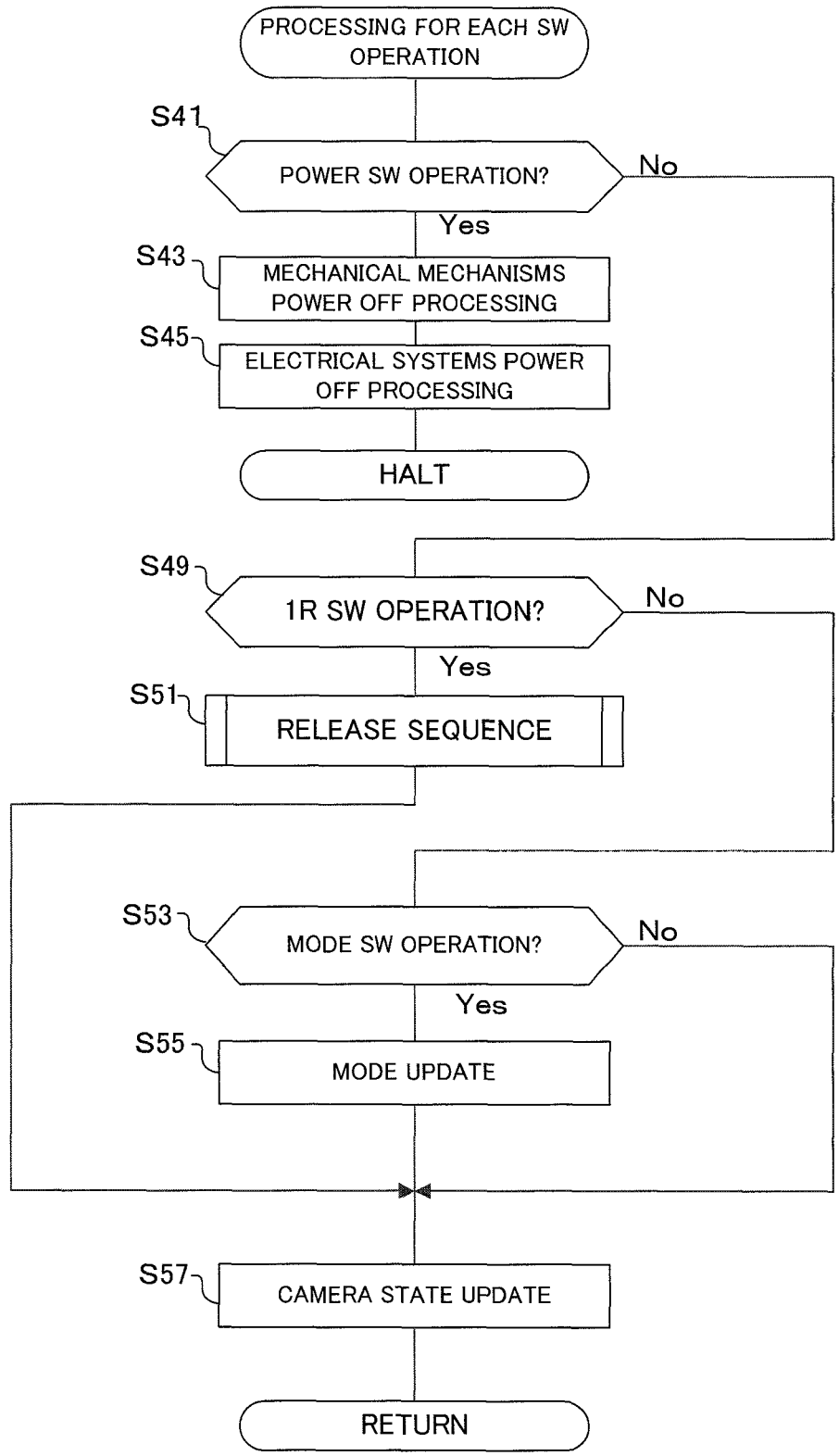
FIG. 5 is a flowchart showing processing for every switch operation of the digital camera of one embodiment of the present invention.

Next, operation for each switch operation in step S17 will be described using the flowchart shown in FIG. 5. If the processing flow for each switch operation is entered, it is first determined whether or not the power switch has been operated (S41). If the results of this determination is that the power switch has been operated, power off processing for mechanical mechanisms is next carried out (S43), power off processing for electrical systems is carried out (S45), and a power off state (Halt) is entered. If the power off state is entered, the CPU 11 of the digital camera prohibits operation, and if the power switch is operated again processing of step 1 starts from power on in FIG. 4.

On the other hand, if the result of determination in step S41 is that the power switch has not been operated, it is next determined whether or not a 1R switch has been operated (S49). The 1R switch is a switch that turns on in response to a half press operation of a release button, and in this step determination is carried out based on whether or not the 1R switch has turned on.

If the result of determination in step S49 is that there has been operation of the 1R switch, a release sequences carried out (S51). Here, shooting preparation operations such as AF processing are executed, and once the release button is pressed down fully a shooting operation is executed. Detailed operation of this release sequence will be described later using FIG. 6.

On the other hand, if the result of determination is step S49 is that there has been no operation of the 1R switch, it is next determined whether or not there has been operation of a mode operation switch (S53). The mode operation switch is an operation switch for selecting a shooting mode, such as continuous shooting mode or single shot shooting mode.

If the result of determination in step S53 is that a mode switch operation has been carried out, mode change is carried out (S55). If the result of this determination is that a mode switch operation has been carried out, mode change is carried out in accordance with the operation. As a result, continuous shooting mode may be set. Also, as continuous shooting mode, as well as normal continuous shooting mode, with this embodiment a shooting mode 2 can also be set. Continuous shooting mode 2 is a mode where if an AF evaluation value becomes low to the extent that a non-focused state is likely, continuous shooting is suspended, and if a focus state is reached by carrying out automatic focus adjustment continuous shooting is restarted.

If the release sequence is executed in step S51, or if mode change is carried out in step S55, or if the result of determination in step S53 is that there has been no operation of the mode switch, state change for the camera is next carried out (S57). Once state change has been carried out, for the camera, the originating processing flow is returned to.

Figure 6:
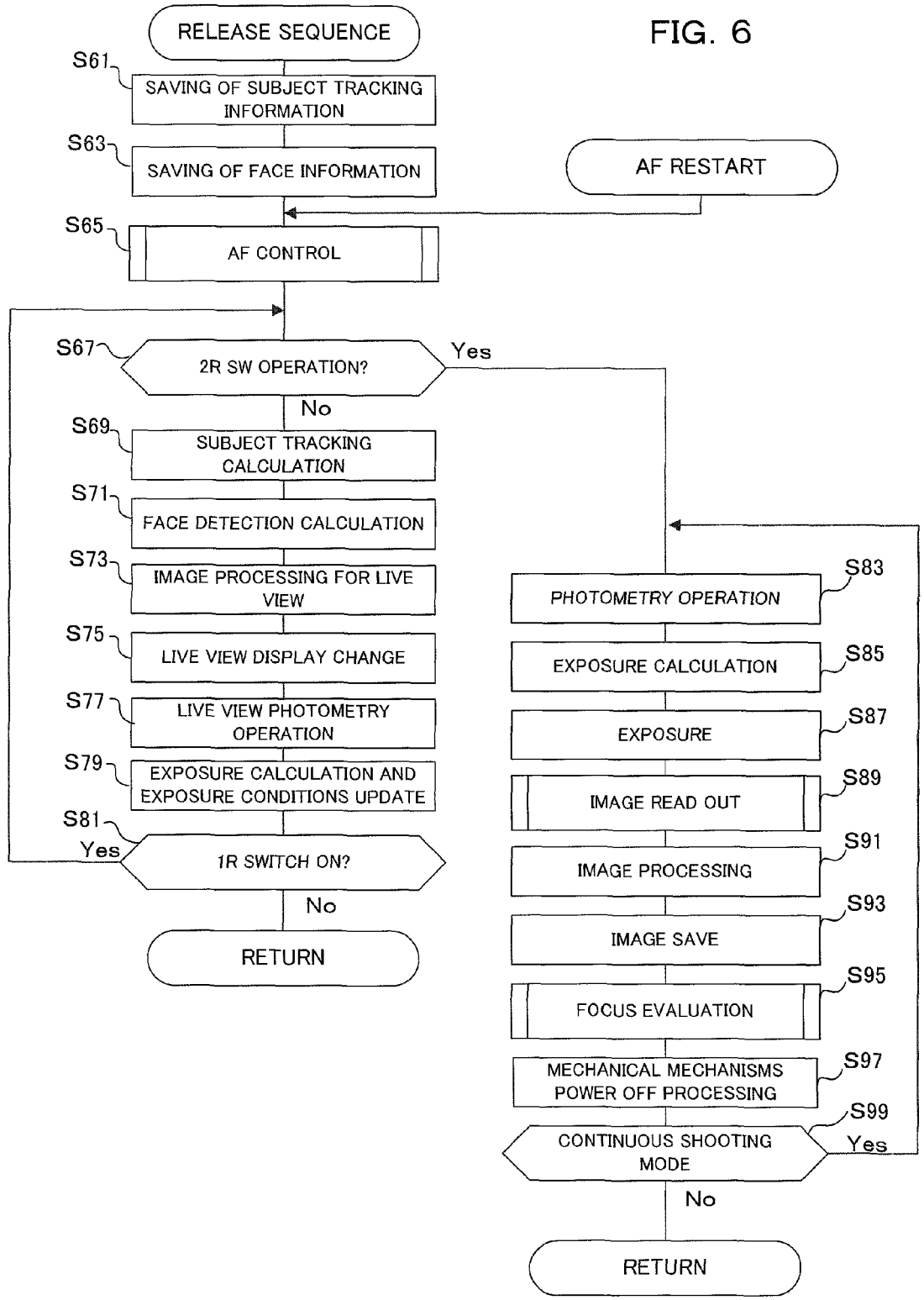
FIG. 6 is a flowchart showing a release sequence of the digital camera of one embodiment of the present invention.

Next, operation of the release sequence in step S51 will be described using the flowchart shown in FIG. 6. If processing flow for the release sequence is entered, first of all subject tracking information is stored (S61). Subject tracking calculation is carried out in step S19, and the calculation results are stored. Once the subject tracking information has been stored, storage of face information is next carried out (S63). Face detection calculation is carried out in step S21, and the calculation results are stored.

Once face information is stored, AF control is carried out (S65). Here, a detection area for AF evaluation detection is set and the photographing lens is moved so that a high-frequency component within the set detection area becomes a peak. Detailed operation of this AF control will be described later using the flowchart shown in FIG. 7. There are cases where this AF control of step S65 is executed as a result of AF restart, as well as at the time of completion of storage of face information in step S63. As will be described later, this AF restart is a case where, in the event that an AF evaluation value at the time of continuous shooting becomes lower than the second threshold value L3 and a non-focused state is likely, continuous shooting is stopped, and automatic focus adjustment of the photographing lens is restarted (refer to the flowchart shown in FIG. 11).

Once AF control has been carried out, it is next determined whether or not there has been operation of the 2R switch (S67). The 2R switch is a switch that turns on in response to a full press operation of a release button, and in this step determination is carried out based on whether or not the 2R switch is turned on. The user determines composition and performs a full press operation of the release button when they have determined a photo opportunity, and so in the case where the 2R switch is on, there is a transition to a shooting operation, while if the 2R switch is off the shooting preparation state continues.

If the result of determination in step S67 is that the 2R switch is not on, subject tracking calculation is then carried out (S69), and face detection calculation is carried out (S71). The image processing section 17 carries out subject tracking calculation and face detection calculation. In the shooting preparation state also, since the subject moves, or a face exists in the image or the position of a face is changed, calculation is carried out to update the information.

Once face detection calculation has been carried out, next, similarly to step S23, image processing for live view is carried out (S73), and live view display update is carried out similarly to step S25 (S75). Then a live view photometry operation is carried out similar to step S27 (S77), and exposure calculation and exposure condition updates are carried out similar to step S29 (S79).

Once a exposure calculation and exposure condition updates have been carried out, it is next determined whether or not the 1R switch is on, similar to step S49 (S81). In the case where the shooting preparation state is to be continued, the user keeps the release button in the half-pressed state, while in the case where the shooting preparation state is to be finished the user takes their finger off the release button. In this step, therefore, whether or not the shooting preparation state is to continue is determined by detecting the state of the 1R switch. If the result of this determination is that the 1R switch is on, processing returns to step S67, while if the 1R switch is off the originating processing flow is returned to.

If the result of determination in step S67 is that the 2R switch has been operated, a photometry operation is carried out (S83). In order to determine an exposure control value at the time of shooting, specifically shutter speed and aperture size etc., photometry values are obtained based on image data from the image sensor 1. Next, exposure calculation is carried out (S85), and here an exposure control value is determined based on the photometry values obtained in step S83.

Next, an exposure operation is carried out (S87). Here, as was described for time t11 and t12 in FIG. 2, a reset operation is carried out for all pixels of the image sensor 1, exposure is started simultaneously for all pixels, and once the shutter time that has been set manually or automatically has elapsed, exposure is simultaneous stopped for all pixels using a mechanical shutter.

Once the photometry operation has been carried out, image read out is carried out (S89). Here, image signals are read out from each pixel by the TG 3 (refer to reference numeral 25b of FIG. 2). Detailed operation of this image read out will be described later using the flowchart shown in FIG. 9.

Once image readout has been carried out, image processing is carried out (S91), and image storage is carried out (S93). Image data that has been read out is temporarily stored in the DRAM 5 (refer to reference numeral 35 in FIG. 2), and after the temporarily store image data has been subjected to image processing by the image processing section 17, an image file is created by the compression processed image file formatting section 19 and stored in the storage media 9.

Together with image processing and image storage, focus evaluation is carried out (S95). Here, subject tracking calculation, face detection calculation, and calculation of an AF evaluation value are performed using image data that is equivalent to image data used in live view display output by the bank switching section 13 (refer to reference numeral 35a of FIG. 2). Detailed operation of this focus evaluation will be described later using the flowchart shown in FIG. 10.

Once this evaluation has been carried out, mechanical mechanism power off processing is carried out (S97). Next, it is determined whether or not continuous shooting mode is active (S99). If there is a mode update, it is determined in steps S53 and S55, and stored. Here, it is determined whether or not the set mode is continuous shooting mode.

If the result of determination in step S99 is continuous shooting mode, processing returns to step S83, and shooting of still images is repeated. On the other hand, if the result of determination is that it is not continuous shooting mode, the shooting operation is completed after shooting a single still image, and the originating processing flow is returned to.

Figure 7:
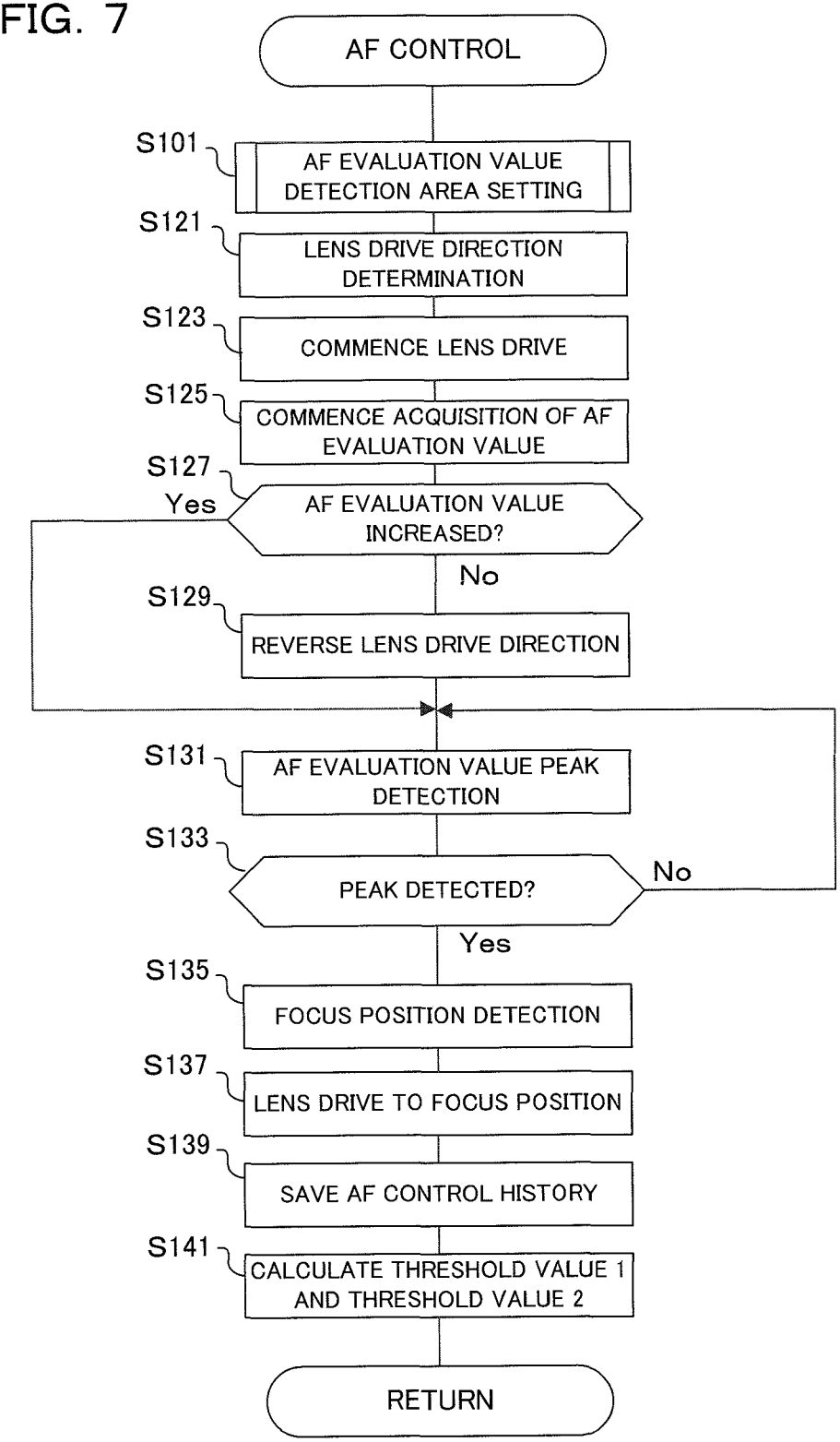
FIG. 7 is a flowchart showing AF control of the digital camera of one embodiment of the present invention.

Next, operation for AF control in step S65 will be described using the flowchart shown in FIG. 7. If the processing flow for AF control is entered, AF evaluation value detection area setting is first carried out (S101). With this embodiment, AF evaluation values are not calculated for all regions of the image data output from the image sensor 1, and instead a detection area is determined and AF evaluation values are calculated based on image data within this detection area. Detailed operation of this AF evaluation value detection area setting will be described later using the flowchart shown in FIG. 8.

Once AF evaluation value detection area setting has been carried out, lens drive direction is determined (S121). As described previously, the automatic focus adjustment of this embodiment is a method of moving the photographing lens so that the AF evaluation value (contrast volume) becomes a peak. Here, a predetermined direction (either toward the close up end or the infinity end) is made the lens drive direction. However, in the case where the continuous shooting is interrupted because the AF evaluation value has become lowered during continuous shooting, since it is possible to calculate the movement direction of the photographing lens, in this case the lens drive direction is made the drive direction during continuous shooting.

Once lens drive direction has been determined, lens drive commences (S123), and acquisition of AF evaluation value is commenced (S125). As described previously, the AF evaluation value calculation section 15 calculates evaluation value using image data having a volume the same as live view display output from the image sensor 1, and the CPU 11 acquires this evaluation value (refer to reference numeral 61 of FIG. 2).

Once the AF evaluation value has been acquired, it is next determined whether or not the AF evaluation value has increased (S127). Here, determination is carried out by comparing the AF evaluation value that was acquired in step S125 and an evaluation value that was acquired the time before. If the result of this determination is that the AF evaluation value has not increased, the lens drive direction is reversed (S129). Here, the lens drive direction is reversed because the photographing lens is moving in a direction away from a peak of the AF evaluation value.

If the lens drive direction has been reversed in step S129, or if the result of determination in step S127 is that the AF evaluation value has increased, a peak of the AF evaluation value is then detected (S131), and it is determined whether or not it is possible to detect a peak (S133). AF evaluation value peak is between where the AF evaluation value is reversed from increasing to decreasing, and so here determination is according to whether or not the AF evaluation value has reversed. If the result of this determination is that the peak cannot be detected, processing returns to step S131, and drive of the photographing lens continues.

On the other hand, if the result of determination in step S133 is that a peak has been detected, calculation of focus position is carried out (S135). Here, focus position of the photographing lens corresponding to the AF evaluation value peak is calculated by carrying out interpolation calculation etc. using positions of 3 points of the photographing lens before and after the AF evaluation value peak. Once focus position has been calculated, the lens is driven to the focus position (S137).

Next, AF control history is stored (S139). As the history, drive amounts and drive direction of the photographing lens and AF evaluation value for every time an AF evaluation value is calculated are stored. Once the AF history is stored, threshold value 1 and threshold value 2 are calculated (S141). Threshold value 1 and threshold value 2 are calculated with an AF evaluation value at the time focus is reached as a reference. Once threshold values 1 and 2 are calculated the originating processing flow is returned to.

Figure 8:
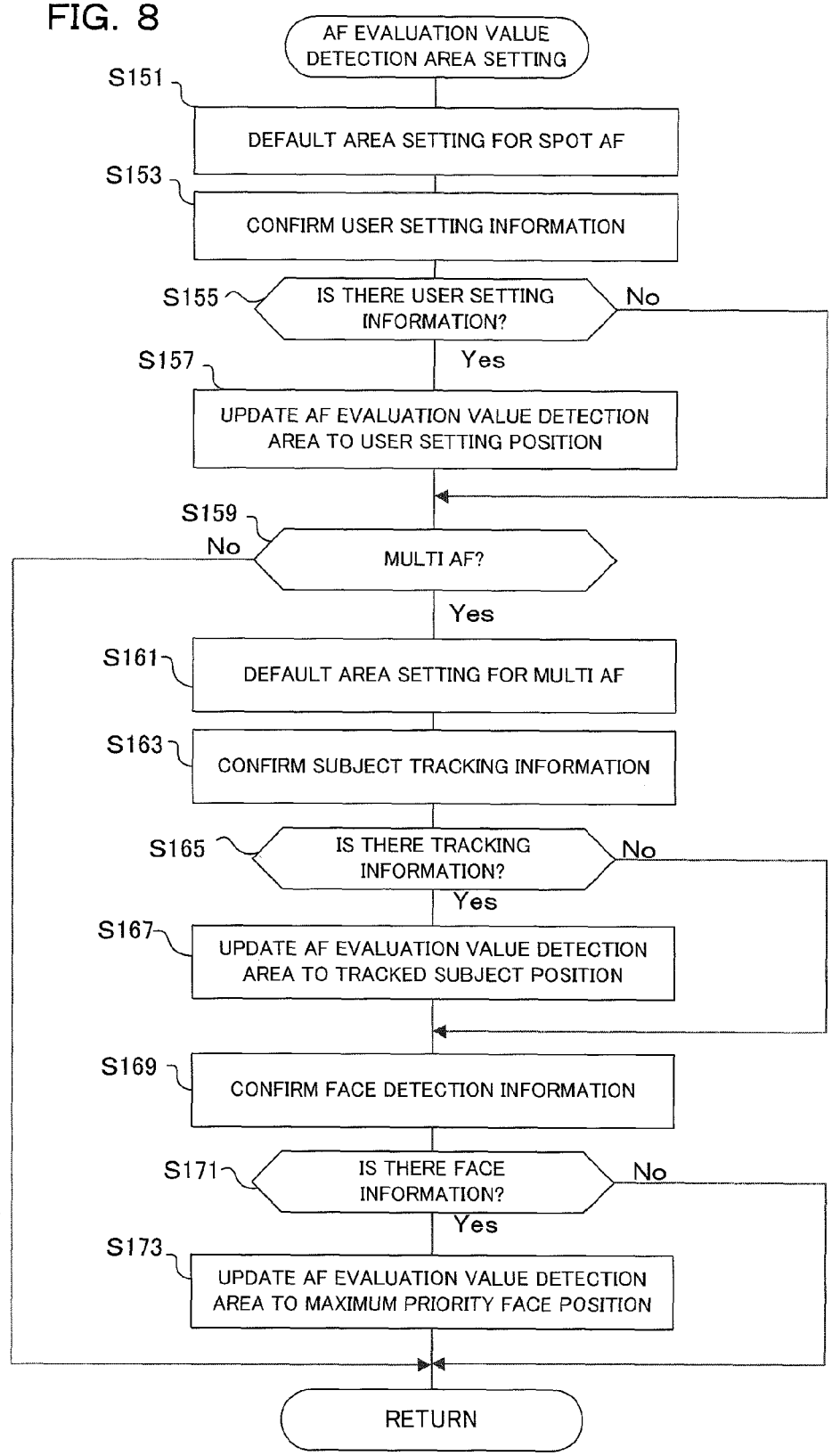
FIG. 8 is a flowchart showing AF evaluation value detection area setting for the digital camera of one embodiment of the present invention.

Next, operation of the AF evaluation value detection area setting of step S101 will be described using the flowchart shown in FIG. 8. If AF evaluation value detection area setting processing flow is entered, setting of a spot AF default area is first carried out (S151). Here, a spot area for the middle of the screen is set as a detection area default area.

Once the default area has been set, confirmation of user setting information is carried out (S153). Here, when carrying out automatic focus adjustment there may be situations where the user is setting the AF evaluation value detection area, and it is confirmed whether or not the AF evaluation value detection area is being set. Next, it is determined whether or not there is user setting information (S155). Determination is based on the confirmation of step S153. If the result of this determination is that there is user setting information, the AF evaluation value detection area is updated to the user setting position (S157).

If the AF evaluation detection area has been updated in step S157, or if the result of determination in step S155 is that there is no user setting information, it is next determined whether or not there is multi AF (S159). Multi AF is a method for detecting a single distance measurement area from among a plurality of distance measuring areas based on subject tracking information or face detection information etc.

If the result of determination step S159 is that there is a multi AF, setting of a multi AF default area is carried out (S161). In the case where multi AF is set, then since there are a plurality of distance measurement areas, a distance measurement area for the center of the screen is set as the default area. Next, confirmation of subject tracking information is carried out (S163). In steps S19 and S69 described previously, subject tracking is carried out, and subject tracking information that was acquired in these steps is confirmed.

If confirmation of subject tracking information has been confirmed, it is then determined whether or not there is tracking information (S165). If the result of this determination is that there is tracking information, the AF evaluation value detection area is updated to the tracked subject position (S167). An area in which the tracked subject exists is set to the AF evaluation value detection area.

If the AF evaluation value detection area has been updated in step S167, or if the result of determination in step S165 is that there is no tracking information, face detection information is next confirmed (S169). In steps S21 and S71 described previously, face detection is carried out, and face information that was acquired in these steps is confirmed.

If confirmation of face detection information has been carried out, it is next determined whether or not there is face information (S171). If the result of this determination is that there is face information, the AF evaluation value detection area is updated to the maximum priority face position (S173). In the event that there is only one item of face information, the position where this face exists is made the AF evaluation value detection area. Also, if there are a plurality of items of face information, a maximum priority face position is made the AF evaluation value detection area. The maximum priority face position is determined based on position and size of face.

If the AF evaluation value detection area has been updated in step S173, if the result of determination in step S171 is that there is no face information, or if the result of determination in step S159 is that there is not multi AF, the originating processing flow is returned to.

Next, operation for image read out in step S89 will be described using the flowchart shown in FIG. 9. If the image readout processing flow is entered, first control update of the image sensor 1 is carried out (S181), and then read out of all pixels is commenced (S183). The image read out here is carried out in the state where the release button is pressed down fully and there is a transition to the shooting operation. Specifically, before transitioning to the shooting operation, image signals for pixels that have been thinned for live view display are read out by the TG 3, but if there is a transition to the shooting operation, pixel signals for all pixels are read out by the TG 3. In this step, control of the image sensor 1 is updated so as to read out image signals for all pixels using the TG 3, and image signals for all pixels are read out.

If readout for all pixels has commenced, next image data is stored in a first region of the DRAM 5 based on all pixels (S185). Next, resizing of image data is carried out based on all pixels (S187). Here, steps S185-S189 are shown for the sake of expediency as a sequence of processes described in the flowchart, but can also be parallel processed using hardware. In this step S187, resizing of image data is carried out based on all pixels in parallel with reading out of all pixel data. Specifically, at the time of the shooting operation image data based on all pixels output from the image sensor 1 is output to the bank switching section 13 as well as being output to the DRAM 5. The bank switching section 13 carries out thinning processing for input image data, and can generate image data that has been resized to the same extent as image data for live view display. Resize image data created by resize processing of all pixel data is stored in a second region of the DRAM 5 in parallel with the resize processing (S189). This corresponds to reference numeral 35a of FIG. 2.

Next, live view display of the resized image is carried out (S191). Image data for the resized image that has been stored in the DRAM 5 is subjected to image processing by the image processing section 17, and then displayed on the TFT 7. This corresponds to reference numerals 47, 48 and 49 of FIG. 2. Using this display on the TFT 7, it is possible for the user to confirm a taken image. In particular, at the time of continuous shooting it becomes possible to easily confirm an image corresponding to movement of the subject. Once live view display of the resized image has been carried out, the originating processing flow is returned to.

Next, operation for focus evaluation in step S95 will be described using the flowchart shown in FIG. 10. If the focus evaluation processing flows entered, the previous AF evaluation value detection area is set to the resized image (S201). As described previously, the resized image is stored in the second region of the DRAM 5. The AF evaluation value detection area that was set in step S101 is set for the image data of this stored resized image.

If setting of the previous AF evaluation value detection area has been carried out, subject tracking calculation is next carried out from the resized image (S203). Here, the image processing section 17 carries out subject tracking calculation using image data that has been stored in the second region of the image processing section 17. Next, face detection calculation is carried out from the resized image (S205). Here, the image processing section 17 carries out face detection calculation using image data has been stored in the second region.

Next, confirmation of tracking information and face information is carried out (S207), and it is determined whether or not there is valid information (S209). At the time of continuous shooting, with increase in the number of continuous frames there may be cases where the tracked subject and the position of a face move. In this step, it is determined whether or not there is this type of movement.

If the result of determination in step S209 is that there is valid information, next update of the AF evaluation value detection area for the resized image is carried out (S211). In step S201 the AF evaluation value detection area is set to the resized image, but update of AF evaluation value detection area is carried out based on valid information.

Once update of the AF evaluation value detection area has been carried out, or if the result of determination in step S209 is that there is not valid information, next an AF evaluation value is acquired from the resized image (S213). Here, the AF evaluation value calculating section 15 calculates an AF evaluation value based on a high-frequency component of the image data corresponding to the AF evaluation value detection area of the resized image created by the bank switching section 13 (refer to reference numeral 55 in FIG. 2), and the CPU 11 acquires the AF evaluation value (refer to reference numeral 65 in FIG. 2).

Figure 9:
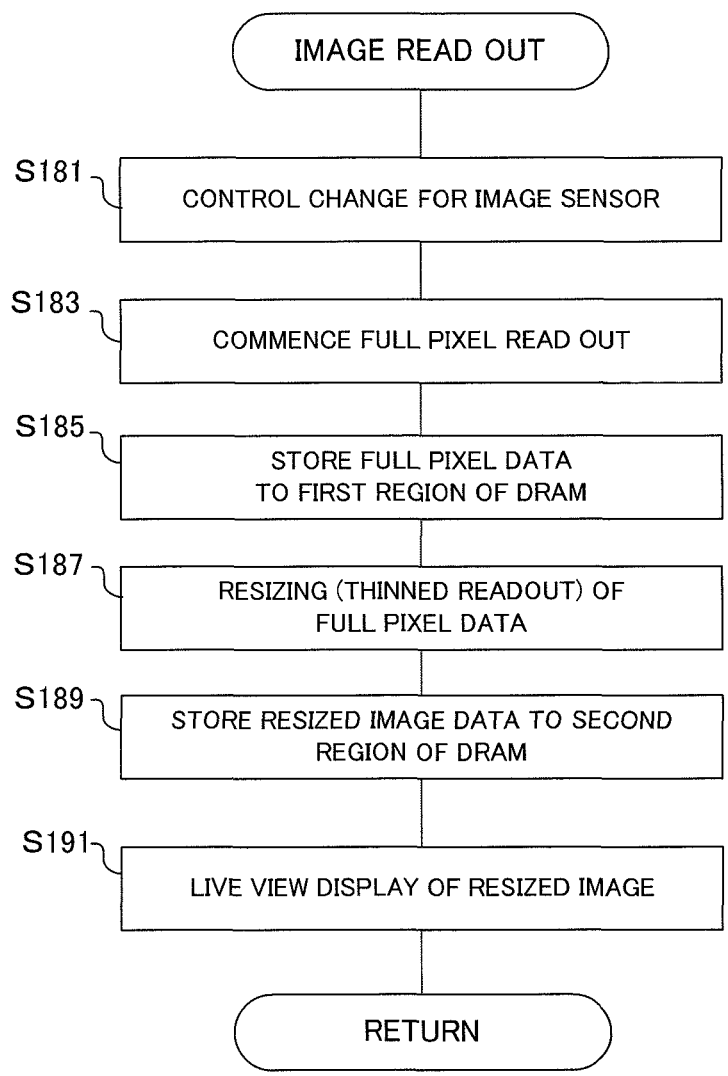
FIG. 9 is a flowchart showing image readout of the digital camera of one embodiment of the present invention.
Figure 10:
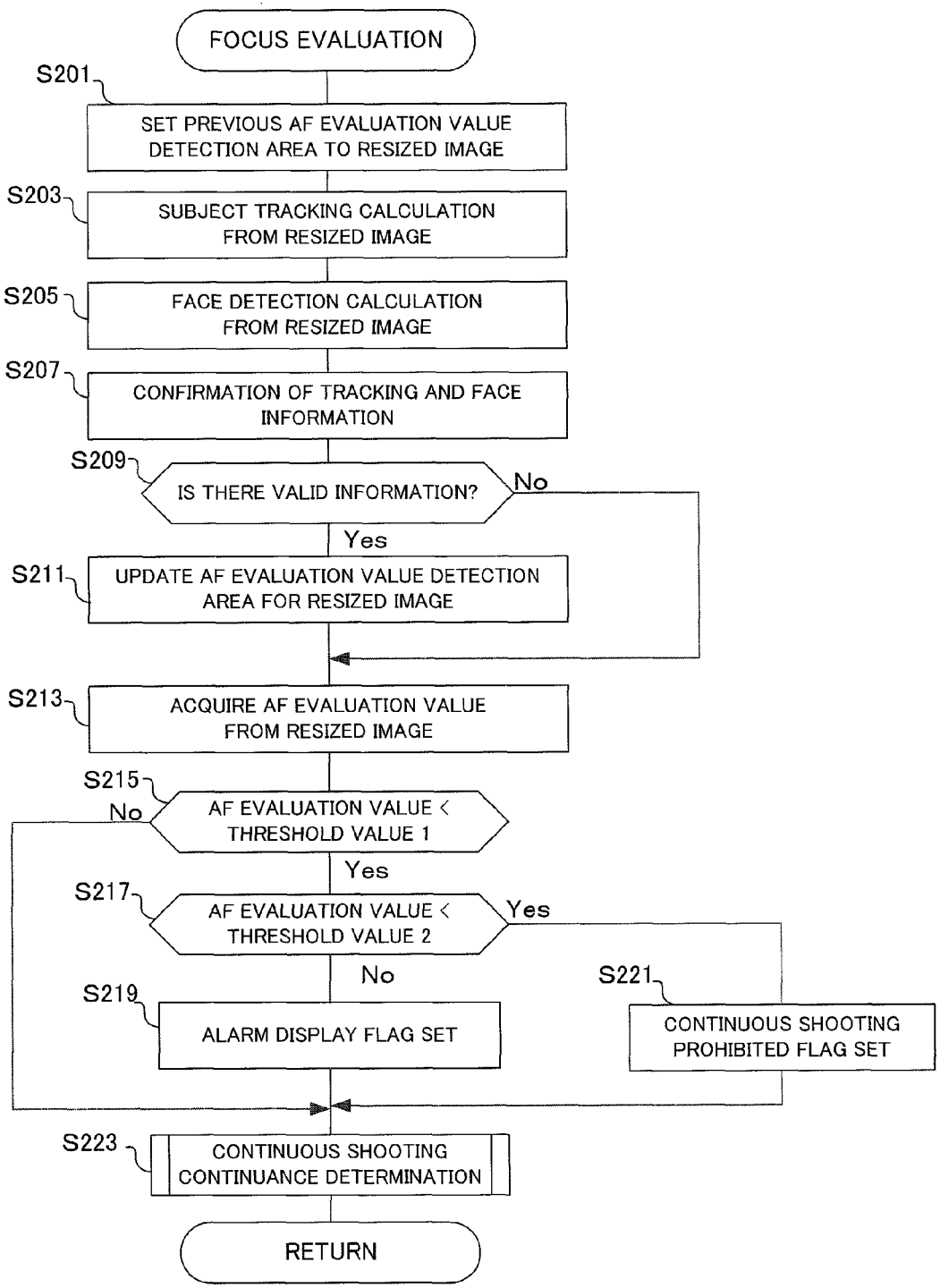
FIG. 10 is a flowchart showing focus evaluation of the digital camera of one embodiment of the present invention.

Although described as step S213 for convenience of the flow of the flowchart of FIG. 10, AF evaluation value calculation using the AF evaluation value calculating section 15 is executed using hardware processing and is processed in parallel with the operation of "resizing of all pixel data (thinning processing)" of step S187 in the "image readout" flowchart of FIG. 9. However, when update occurs in the "update of the AF evaluation value detection area for the resized image" of step S211, calculation of an AF evaluation value from image data of the updated AF evaluation value detection area is carried out again using the resized image that has been stored in the second region of the DRAM 5.

If AF evaluation value has been acquired, it is next determined whether or not the AF evaluation value is smaller than threshold value 1 (refer to L2 of FIG. 3) (S215). If the result of this determination is that the AF value is smaller than threshold value 1, it is then determined whether or not the AF evaluation value is smaller than threshold value 2 (refer to L3 of FIG. 3) (S217). If the result of this determination is that the AF evaluation value is smaller than threshold value 2, a continuous shooting prohibited flag is set (S221), while if the AF evaluation value is larger than threshold value 2, an alarm display flag is set (S219).

If the warning display flag is set in step S219, if the continuous shooting prohibited flag is set in step S221, or if the result of determination in step S215 is that the AF evaluation value is larger than threshold value 1, continuous shooting continuance determination is then carried out (S223). Here, processing is carried out depending on the flag that has been set. Details of this continuous shooting continuance determination will be described later using the flowchart shown in FIG. 11. Once the continuous shooting continuance determination has been performed, the original processing flow is returned to.

Figure 11:
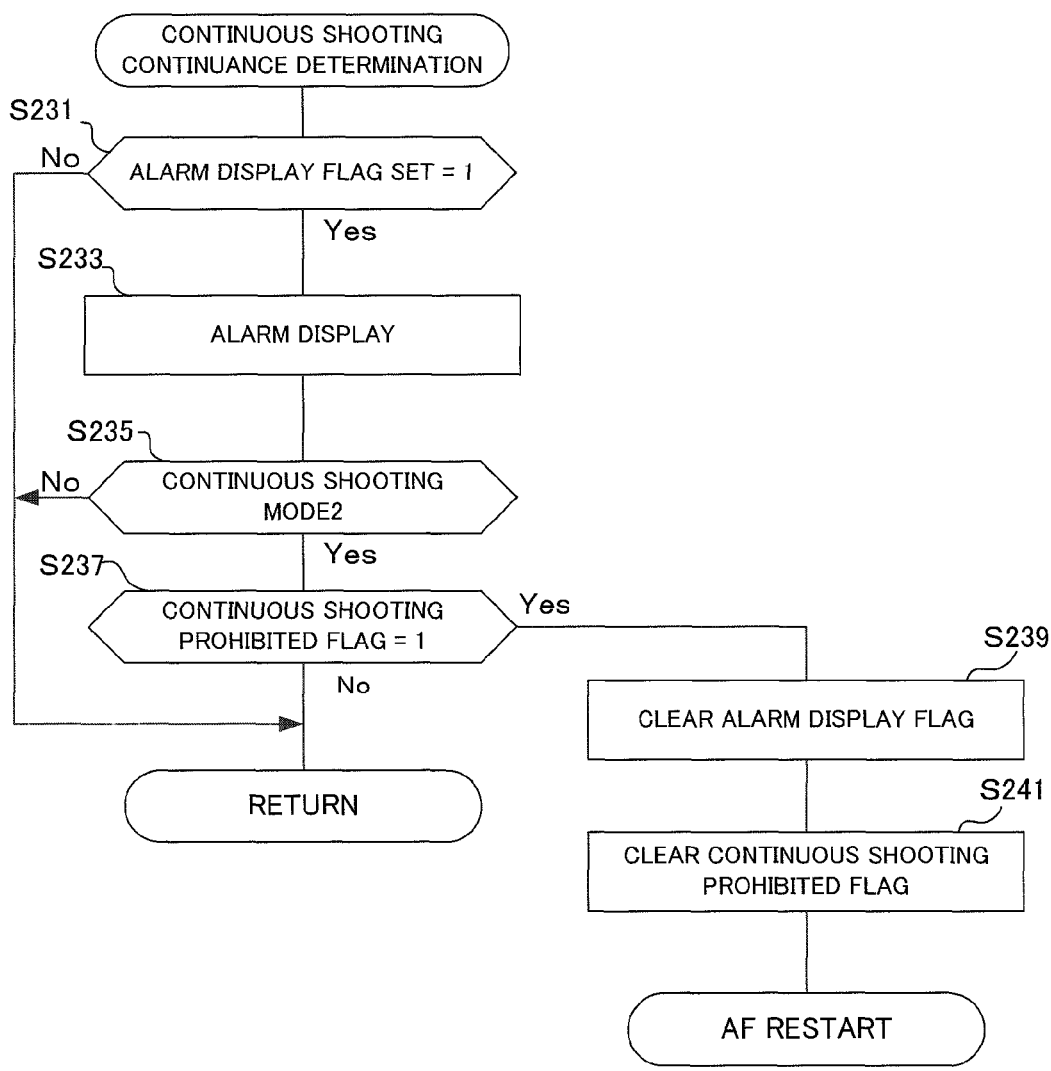
FIG. 11 is a flowchart showing continuous shooting continuance determination of the digital camera of one embodiment of the present invention.

Next, operation of the continuous shooting continuance determination in step S223 will be described using the flowchart shown in FIG. 11. If the processing flow for continuous shooting continuance determination is entered, it is first determined whether or not the alarm display flag is 1, specifically, whether or not the alarm display flag has been set (S231).

If the result of determination in step S231 is that the alarm display flag is 1, alarm display is carried out (S233). Here, indication that the photographing lens is out of focus is displayed on the TFT 7 as an alarm. It is also possible to carry out other visual or audible alarm display.

Once alarm display has been carried out, it is next determined whether or not continuous shooting mode 2 has been set (S235). Since it is possible for the user to set continuous shooting mode 2 (refer to S55), determination in this step is carried out based on the set mode. If the results of this determination is that the continuous mode 2 set, it is next determined whether or not the continuous shooting prohibited flag is 1, specifically, whether or not the continuous shooting prohibited flag has been set (S237).

If the result of determination in step S237 is that the continuous shooting prohibited flag is not 1, if the result of determination in step S235 is that continuous shooting mode 2 is not set, or if the result of determination in step S231 is that the alarm display flag is not 1, the originating processing flow is returned to On the other hand, if the result of determination in step S237 is that the continuous shooting prohibited flag is 1, next, the alarm display flag is cleared (S239), and the continuous shooting prohibited flag is cleared (S241). Once these flags have been cleared, an AF restart is carried out. As was described previously, once AF restart is carried out, processing jumps to step S65 (refer to FIG. 6), and once again AF control is carried out and automatic focus adjustment of the photographing lens is carried out. If the photographing lens reaches a focused state, and the release button is pressed down fully, continuous shooting is started again in steps S83-S99.

In this way, in one embodiment of the present invention, in a continuous shooting operation for still images, together with storage of image data for still images output from the image sensor 1, image data for a resized image of a plurality of pixels of the same amount as for live view display is generated, and AF evaluation value calculation is carried out based on this resized image data. As a result, it is possible to improve following capability of the focus adjustment operation during a continuous shooting operation.

Also, in one embodiment of the present invention, an image that has been resized during continuous shooting is subjected to live view display. As a result, there is the advantage that it is possible to confirm a taken image during continuous shooting. Further, in one embodiment of the present invention, if the AF evaluation value is lowered, processing is carried out depending on the AF evaluation value, such as alarm display according to the level of the AF evaluation value, or restarting continuous shooting from the carrying out of automatic focus adjustment operation after interrupting continuous shooting etc. It is possible to carry out appropriate focusing according to the AF evaluation value.

Figure 14:
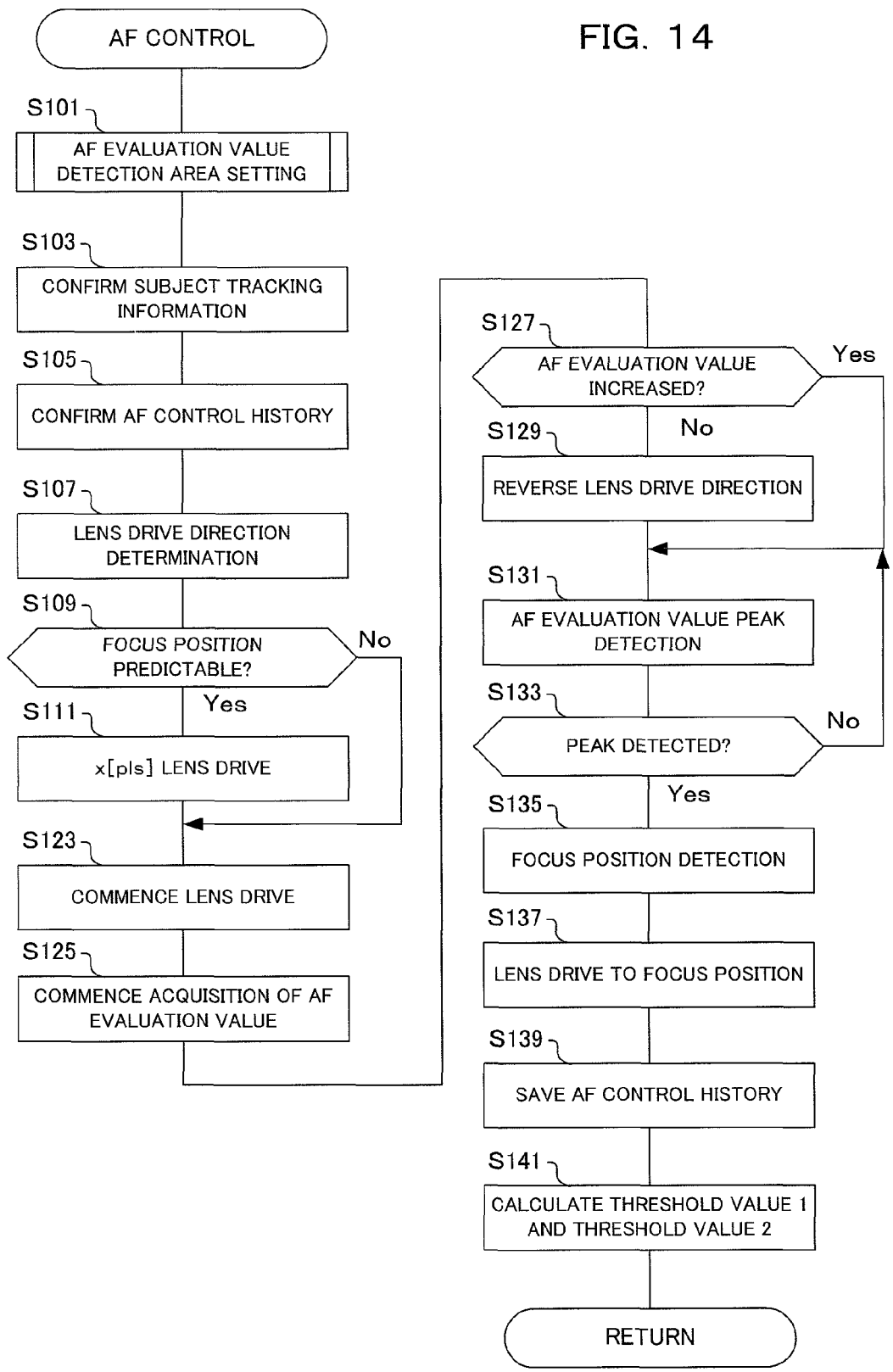
FIG. 14 is a flowchart showing a modified example of AF control of the digital camera of one embodiment of the present invention.
Figure 15:
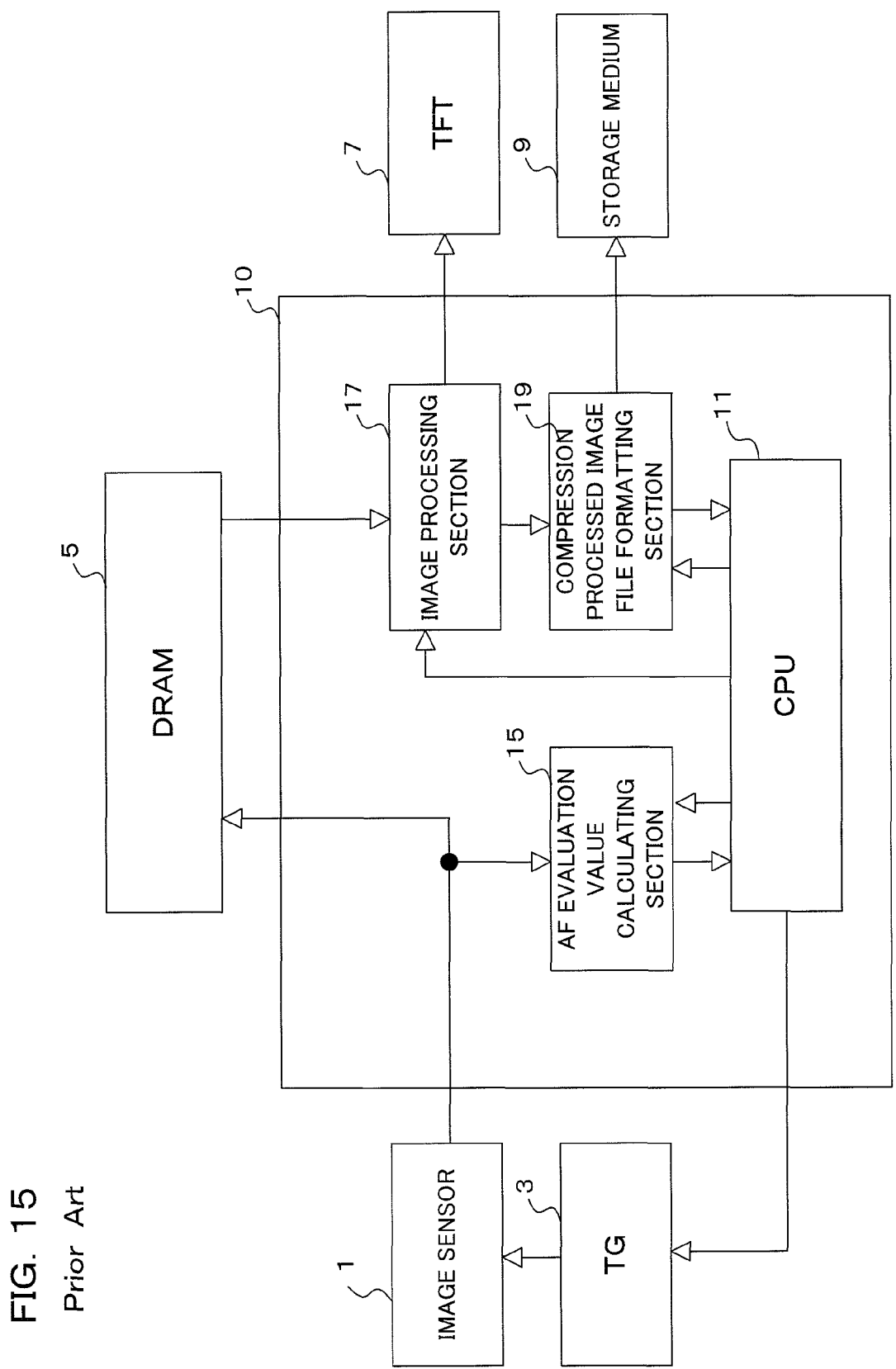
FIG. 15 is a block diagram showing overall structure of a digital camera of related art, mainly concentrating on the electrical systems.

Next, a modified example of AF control of the one embodiment will be described using FIG. 12 to FIG. 14. In one embodiment of the present invention, AF control is carried out in the flowchart shown in FIG. 7. In the case where continuous shooting is suspended during continuous shooting and AF control is restarted, the photographing lens is only being driven in the drive direction of the lens during continuous shooting. Conversely with this modified example, drive direction and predicted drive amount are calculated based on an AF evaluation value history acquired during live view display and an AF evaluation value history acquired during continuous shooting, and drive of the photographing lens is carried out.

Figure 12A:
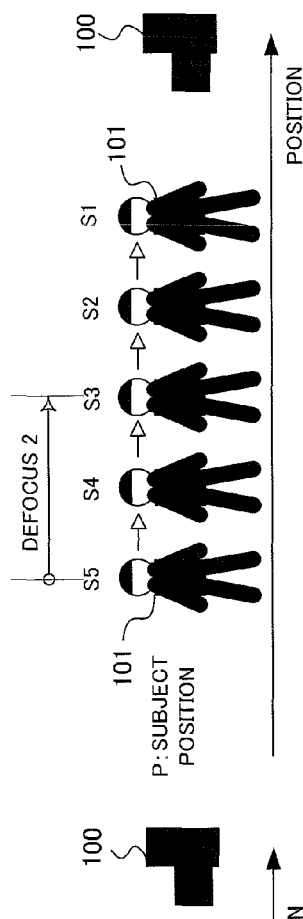
FIG. 12A to FIG. 12C are drawings for describing a modified example of AF control of the digital camera of one embodiment of the present invention.
Figure 12B:
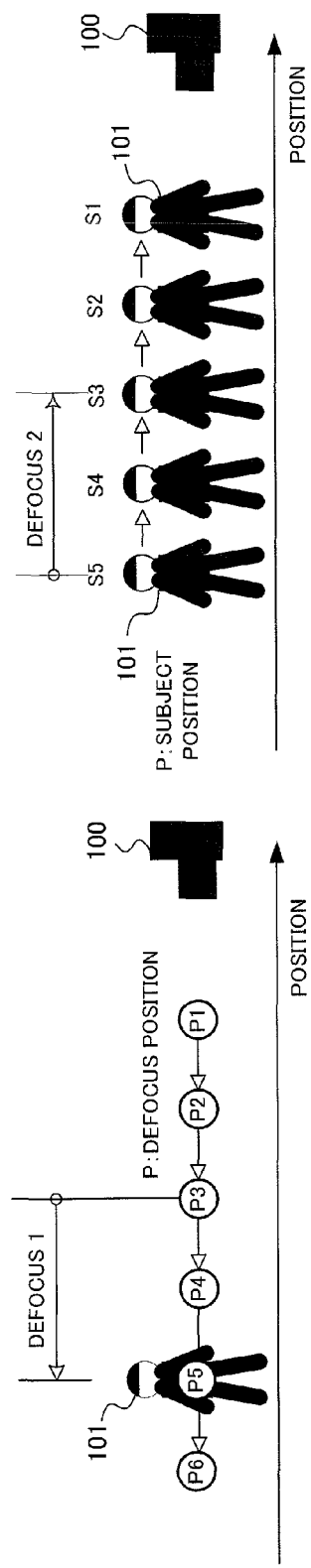
Figure 12C:
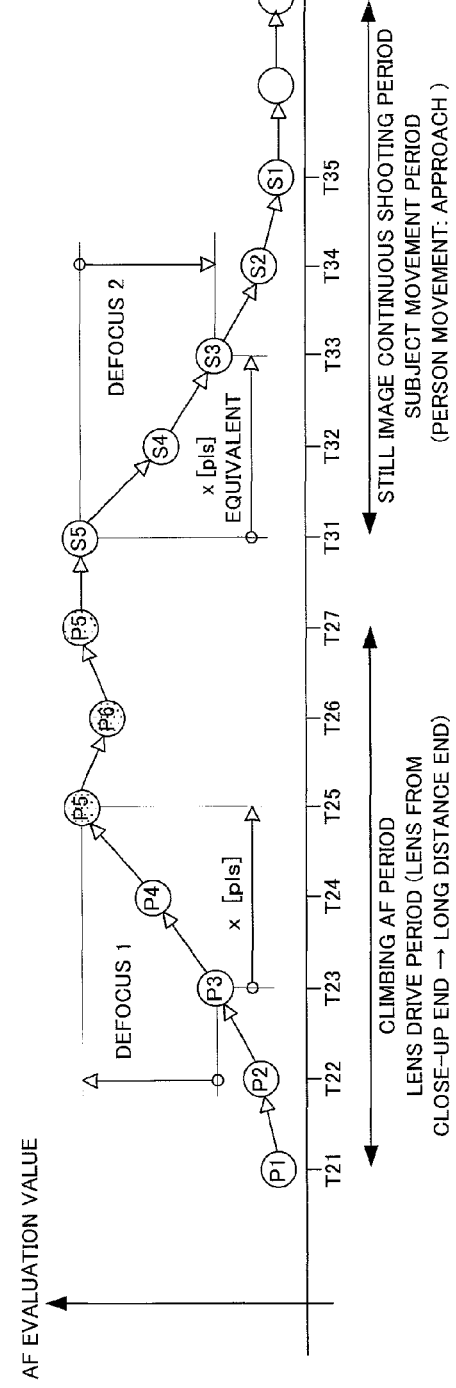

FIG. 12A shows variation in focus position for automatic focus adjustment of the digital camera 100 during live view display, FIG. 12B shows movement of a subject 101 after commencement of continuous shooting from live view display, and FIG. 12C shows variation in AF evaluation value during live view display and during continuous shooting.

During live view display, if the digital camera 100 commences automatic focus adjustment, with the example shown in FIG. 12 the subject 101 is at position P5, and the initial focus position of the photographing lens is position P1. If the digital camera 100 drives the photographing lens using a so-called climbing method so that the AF evaluation value becomes high, the focus position of the photographing lens changes in the order position P2→position P3→position P4→position P5→position P6→position P5. Variation in the AF evaluation value at this time is shown in FIG. 12C. At time T21, position P1 is the focus position, and as the focus position changes to position P2→Position P3→position P4→position P5→position P6→position P5 after that, the AF evaluation value becomes high, and it is possible to consider that focus is reached at position P5 and position P5 between times T25 and T27.

Once the photographing lens is in focus and the user commences continuous shooting, there may be cases where the subject 101 gradually becomes closer to the digital camera 100. With the example shown in FIG. 12B, at the time of starting continuous shooting the subject 101 is at position P5, but changes from position S5→position S4→position S3→position S2→position S1. As shown in FIG. 12C, the AF evaluation value is high due to being in focus, and as the subject get closer after that with the lapse of time, the AF evaluation value is lowered.

In this way, if the subject 101 approaches the digital camera 100, the photographing lens gradually becomes out of focus, the AF evaluation value becomes lower than the second threshold value L3, continuous shooting is interrupted, and automatic focus adjustment (AF control) is carried out. A case where AF control is restarted at time T33 and position S3 will be assumed. In FIG. 12A, the defocus 1 between position P3 and position P5 corresponds to the photographing lens drive amount (x [pls]) in FIG. 12C. Here, the drive amount x[pls] is the number of pulses of an encoder generated depending on photographing lens drive.

If an absolute value for defocus 2 at the time of suspension of continuous shooting is almost the same as defocus 1, then as shown in FIG. 12C it will be understood that the photographing lens is brought into focus by moving the focus position of the photographing lens toward the close-up end by a distance equivalent to x [pls]. Specifically, defocus is calculated from the difference between AF evaluation value when continuous shooting is interrupted, and AF evaluation value at the time of focus. Then, this calculated defocus and defocus at the same time as live view display are detected, and if it is possible to obtain a drive amount (x [pls]) at this time it is possible to predict drive amount (x [pls]) of the photographing lens to the focus position at the time of continuous shooting suspension.

There are cases where it is possible and cases where it is not possible to predict the photographing lens drive amount (in other words focus position) using photographing lens drive direction at the time of live view display and movement direction of the subject at the time of continuous shooting. This relationship is shown in FIG. 13. As will be understood from FIG. 13, in a case where the photographing lens moves from the close-up end to the long distance end in order to achieve focus at the time of live view display, and the subject moves from the long-distance end to the close-up end at the time of continuous shooting, it is possible to predict focus position.

Similarly, in a case where the photographing lens moves from the long-distance end to the close-up end in order to achieve focus at the time of live view display, and the subject moves from the close-up end to the long-distance end at the time of continuous shooting, it is possible to predict focus position. In cases other than these, it is possible to predict whether the drive direction of the photographing lens is toward the close up end or the long-distance, but it is not possible to predict the drive amount.

Next, operation of this modified example will be described using the flowchart for AF control shown in FIG. 14. This flowchart has step S121 omitted from the AF control flowchart shown in FIG. 7, with steps S103-S111 added instead, and other than that is the same as the flowchart shown in FIG. 7. Description will therefore concentrate on points of difference.

If the processing flow for AF control is entered, AF evaluation value detection area setting is first carried out (S101). Details of this step are as was described using FIG. 8. Next, similarly to step S163, subject tracking information that was acquired in steps S19 and S69 is confirmed (S103). Next, AF control history is confirmed (S105). If AF control is carried out, an AF control history at that time, namely drive direction and drive amount of the photographing lens and AF evaluation values up until focus position is reached, are stored (refer to S139 of FIG. 7), and so this is confirmed.

If AF control history has been confirmed, lens drive direction is next determined (S107). As shown in FIG. 13, the drive direction can be predicted based on lens drive direction at the time of live view display and movement direction of the subject at the time of continuous shooting. If lens drive direction has been determined, prediction of focus position is next carried out (S109). From the relationship shown in FIG. 13, it is determined whether or not the focus position can be predicted.

If the result of determination in step S109 is that prediction of focus position is possible, lens drive is set to x [pls] (S111). Here, focus position is predicted using the AF control history that was confirmed in step S105, and drive of the photographing lens is carried out. Specifically, a position at which the focus is the same as at the time of live view display is detected, a drive amount of the photographing lens (x [pls]) from the focus position to that position is made a prediction value for up to the focus position, and photographing lens drive is set to this x [pls].

If the photographing lens is driven by x [pls] in step S111, or if the result of determination in step S109 is that prediction of focus position is impossible, lens drive is commenced (S123). The operations in step S123 and after are the same as those in FIG. 7, and so detailed description is omitted.

In this way, with this modified example, in the case where AF evaluation value is lowered, continuous shooting is suspended and AF control is restarted, prediction of focus position is carried out using AF control history at the time of live view display and at the time of continuous shooting. As a result, even if continuous shooting is interrupted, AF control is carried out rapidly and it is possible to restart continuous shooting.

As has been described above, in the one embodiment and the modified example of the present invention, together with reading out image data for still image storage, image data having a data amount that is the same as image data for display of the read-out image data is created, and AF evaluation value is detected based on this created image data. As a result, it is possible to carry out AF evaluation rapidly, and it is possible to improve the following capability of a focus adjustment operation during a continuous shooting operation.

Also, in the one embodiment and the modified example of the present invention, an image is displayed during continuous shooting based on image data having the same data volume as image data for display that has been generated. As a result, it is possible to easily observe a subject image during a continuous shooting operation.

In one embodiment and modified example of the present invention, during the continuous shooting operation the TG 3 reads out image signals for all pixels, but this is not limiting, and image signals for pixels corresponding to a stored number of pixels that has been set may be read out.

Also, with the one embodiment and modified example of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as an imaging device is capable of carrying out continuous shooting of still image.

The present invention is not limited to the above described embodiment, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A digital camera having an imaging section, comprising:
   a readout section for reading out first image data for still image storage from the imaging section;

a storage section for subjecting the first image data to image processing and storing the resultant data;
an image data generating section for generating second image data having fewer pixel data than the first image data, from the first image data; and
a detection section for detecting at least one evaluation value based on the second image data, wherein a detection operation of the evaluation value by the detection section is executed in parallel with a readout operation of the first image data by the readout section and a still image storage operation by the storage section.

2. The digital camera disclosed in claim 1, wherein:
a still image continuous shooting operation, for repeatedly executing the imaging operation of the imaging section, the readout operation of the readout section, and the storage operation of the storage section, is possible, and in the continuous shooting operation the readout operation of the first image data by the readout section, the still image storage operation by the storage section and an evaluation value detection operation by the detection section are executed in parallel.

3. The digital camera disclosed in claim 1, further comprising:
a display section for displaying an image based on the second image data,
wherein a still image storage operation for the storage section, an evaluation value detection operation by the detection section, and the display operation based on the second image data by the display section are executed in parallel.

4. The digital camera disclosed in claim 3, wherein:
a still image continuous shooting operation, for repeatedly executing the imaging operation of the imaging section, the readout operation of the readout section, and the storage % operation of the storage section, is possible, and in the continuous shooting operation a still image storage operation by the storage section and an evaluation value detection operation by the detection section are executed in parallel.

5. The digital camera disclosed in claim 1, wherein:
the at least one evaluation value is an AF evaluation value for a focus adjustment operation.

6. The digital camera disclosed in claim 1, wherein:
the image data generating section generates second image data having fewer pixel data than the first image data, by carrying out thinning processing on the first image data.

7. A digital camera having an imaging section, comprising:
a readout section for reading out first image data for still image storage from the imaging section;
a storage section for subjecting the first image data to image processing and storing the resultant data;
an image data generating section for generating second image data having fewer pixel data than the first image data, from the first image data; and
a detection section for detecting at least one evaluation value based on the second image data, wherein a detection operation of the evaluation value by the detection section is executed in parallel with a still image storage operation by the storage section, wherein:
the image data generating section generates second image data having fewer pixel data than the first image data, by carrying out processing to add pixel data of the first image data.

8. A digital camera having an imaging section, comprising:
a readout section for reading out first image data for still image storage from the imaging section;
a storage section for subjecting the first image data to image processing and storing the resultant data;
an image data generating section for generating second image data having fewer pixel data than the first image data, from the first image data;
a first detection section for detecting an AF evaluation value based on the second image data; and
a determination section for determining a specified amount of variation in degree of focus based on the AF evaluation value which is output of the first detection section, wherein determination of degree of focus by the determination section is executed in parallel with the readout of the first image data by the readout section and still image storage by the storage section.

9. The digital camera disclosed in claim 8, wherein:
the determination section issues an alarm in the event that it is determined that the degree of focus has fallen below the specified amount.

10. The digital camera disclosed in claim 8, wherein:
a still image continuous shooting operation, for repeatedly executing the imaging operation of the imaging section, the readout operation of the readout section, and the storage operation of the storage section, is possible, and in the continuous shooting operation a still image storage operation by the storage section and an evaluation value determination operation by the determination section are executed in parallel.

11. The digital camera disclosed in claim 10, wherein:
there are a plurality of continuous shooting modes and it is possible to switch between the continuous shooting modes, and
in the first continuous shooting mode, the determination section issues and alarm in the event that it is determined that the degree of focus has fallen below the specified amount, and in the second continuous shooting mode, the determination section suspends the continuous shooting operation in the event that it is determined that the degree of focus has fallen below the specified amount.

12. The digital camera disclosed in claim 8, further comprising:
a display section for displaying an image based on the second image data,
wherein
the still image storage operation by the storage section, the evaluation value determination operation by the determination section, and the display operation based on the second image data by the display section are executed in parallel.

13. The digital camera disclosed in claim 12, wherein:
a still image continuous shooting operation, for repeatedly executing the imaging operation of the imaging section, the readout operation of the readout section, and the storage operation of the storage section, is possible, and in the continuous shooting operation a still image storage operation by the storage section, an evaluation value determination operation by the determination section and a display operation based on the second image data by the display section are executed in parallel.

14. The digital camera disclosed in claim 8, wherein:
the image data generating section generates second image data having fewer pixel data than the first image data, by carrying out thinning processing on the first image data.

15. A digital camera having an imaging section, comprising:
a readout section for reading out first image data for still image storage from the imaging section;

a storage section for subjecting the first image data to image processing and storing the resultant data;

an image data generating section for generating second image data having fewer pixel data than the first image data, from the first image data;

a first detection section for detecting an AF evaluation value based on the second image data; and a determination section for determining a specified amount of variation in degree of focus based on the AF evaluation value which is output of the first detection section, wherein determination of degree of focus by the determination section is executed in parallel with still image storage by the storage section, wherein:

a still image continuous shooting operation, for repeatedly executing the imaging operation of the imaging section, the readout operation of the readout section, and the storage operation of the storage section, is possible, and in the continuous shooting operation a still image storage operation by the storage section and an evaluation value determination operation by the determination section are executed in parallel, and wherein the determination section suspends the continuous shooting operation in the event that it is determined that the degree of focus during the shooting operation has fallen below the specified amount.

16. The digital camera disclosed in claim 15, wherein:

after suspension of the continuous shooting operation, focus position of the photographing lens is predicted based on a degree of focus history determined before commencement of the continuous shooting operation and a degree of focus history determined after commencement of the continuous shooting operation, and the photographing lens is moved to the focus position.

17. A digital camera having an imaging section, comprising:

a readout section for reading out first image data for still image storage from the imaging section;

a storage section for subjecting the first image data to image processing and storing the resultant data;

an image data generating section for generating second image data having fewer pixel data than the first image data, from the first image data;

a first detection section for detecting an AF evaluation value based on the second image data; and a determination section for determining a specified amount of variation in degree of focus based on the AF evaluation value which is output of the first detection section, wherein determination of degree of focus by the determination section is executed in parallel with still image storage by the storage section, wherein:

the image data generating section generates second image data having fewer pixel data than the first image data, by carrying out processing to add pixel data of the first image data.

18. An evaluation value detection method for detecting an evaluation value based on image data for still image storage output from an imaging section, comprising:

reading out first image data for still image storage from the imaging section; and subjecting the first image data to image processing and storing the resultant data;

generating second image data having fewer pixel data than the first image data, from the first image data, and detecting at least one evaluation value based on the second image data, wherein the act of detecting the at least one evaluation value is executed in parallel with the act of reading out the first image data and the still image storage.

19. The evaluation value detection method disclosed in claim 18, wherein:

in a still image continuous shooting operation, for repeatedly executing the imaging operation of the imaging section, the readout operation of the readout section, and the storage operation of the storage section, the still image storage operation and the evaluation value detection operation are executed in parallel.

* * * * *